United States Patent
Kurimoto et al.

(10) Patent No.: US 10,711,895 B2
(45) Date of Patent: Jul. 14, 2020

(54) CONTROL APPARATUS FOR VEHICLE TRANSMISSION

(71) Applicant: Toyota Jidosha Kabushiki Kaisha, Toyota-shi (JP)

(72) Inventors: Tomoyasu Kurimoto, Aichi-gun (JP); Akihiko Ichikawa, Toyota (JP); Shinichi Takeuchi, Nisshin (JP); Jun Yabuta, Nagoya (JP); Yuki Masui, Nukata-gun (JP); Takeshi Yano, Nishio (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 16/358,103

(22) Filed: Mar. 19, 2019

(65) Prior Publication Data

US 2019/0301605 A1  Oct. 3, 2019

(30) Foreign Application Priority Data

Mar. 29, 2018  (JP) .................................. 2018-065802

(51) Int. Cl.
*F16H 61/12* (2010.01)
*F16H 63/50* (2006.01)
(Continued)

(52) U.S. Cl.
CPC ......... *F16H 63/50* (2013.01); *F16H 61/0213* (2013.01); *F16H 61/12* (2013.01);
(Continued)

(58) Field of Classification Search
CPC .. F16H 61/0202; F16H 61/0213; F16H 61/12; F16H 2061/1256; F16H 2061/1288; F16H 2061/1272
See application file for complete search history.

(56) References Cited

U.S. PATENT DOCUMENTS

| 5,755,398 A * | 5/1998 | Thompson, Sr. ...... B65H 75/14 242/614 |
| 2001/0023619 A1 * | 9/2001 | Ota .......................... F16H 61/32 74/335 |

(Continued)

FOREIGN PATENT DOCUMENTS

DE   100 65 387 A1   7/2001
JP   2017-40333      2/2017

*Primary Examiner* — Edwin A Young
(74) *Attorney, Agent, or Firm* — Oblon, McClelland, Maier & Neustadt, L.L.P.

(57) ABSTRACT

A control apparatus for a vehicle transmission that includes: transmission gears disposed on a shaft; a switching mechanism which is to be switched between a connecting state in which one of the transmission gears is rotatable integrally with the shaft and a disconnecting state in which the one of the transmission gears is rotatable relative to the shaft; a shift fork for axially moving the switching mechanism; and a shift barrel to be rotated to position the shift fork. The switching mechanism includes first and second rings and an elastic member which is disposed between the first and second rings in the axial direction and connects the first and second rings. The control apparatus determines that a failure occurs in the vehicle transmission, when a value related to a reaction force that acts on the shift barrel during rotation of the shift barrel is deviated from a predetermined range.

10 Claims, 9 Drawing Sheets

(51) Int. Cl.
  *F16H 61/02* (2006.01)
  *F16H 63/18* (2006.01)
  *B60W 10/11* (2012.01)
  *F16D 11/10* (2006.01)
  *F16D 11/14* (2006.01)
  *F16H 3/091* (2006.01)
  *F16H 63/30* (2006.01)
  *F16H 55/17* (2006.01)

(52) U.S. Cl.
  CPC ............ *F16H 63/18* (2013.01); *B60W 10/11* (2013.01); *F16D 11/10* (2013.01); *F16D 11/14* (2013.01); *F16H 3/0915* (2013.01); *F16H 63/30* (2013.01); *F16H 2055/178* (2013.01); *F16H 2061/1208* (2013.01); *F16H 2061/1272* (2013.01); *F16H 2063/3093* (2013.01); *F16H 2200/0052* (2013.01)

(56) References Cited

U.S. PATENT DOCUMENTS

| | | |
|---|---|---|
| 2017/0051811 A1 | 2/2017 | Takeuchi et al. |
| 2017/0152945 A1* | 6/2017 | Ishiyama ................ F16H 63/14 |
| 2018/0073635 A1 | 3/2018 | Takeuchi et al. |

* cited by examiner

CONTROL APPARATUS FOR VEHICLE TRANSMISSION

This application claims priority from Japanese Patent Application No. 2018-065802 filed on Mar. 29, 2018, the disclosure of which is herein incorporated by reference in its entirety.

FIELD OF THE INVENTION

The present invention relates to a determination of failure of a vehicle transmission.

BACKGROUND OF THE INVENTION

There is proposed a vehicle transmission that includes: a shaft; a transmission gear which is disposed on the shaft and which is rotatable relative to the shaft; and a switching mechanism which is to be switched between a connecting state in which the transmission gear is rotatable integrally with the shaft and a disconnecting state in which the transmission gear is rotatable relative to the shaft. The switching mechanism includes a first ring, a second ring and an elastic member connecting the first and second rings. The first ring is disposed in a position adjacent to the transmission gear in an axial direction of the shaft and which is to be rotatable together with the shaft, while the second ring is disposed on one of opposite sides of the first gear, which is remote from the transmission gear in the axial direction. A vehicle transmission, which is disclosed in JP2017-040333A, is an example of this type of the vehicle transmission.

In the vehicle transmission disclosed in this Japanese Patent Application Publication, upon execution of a shifting action in the transmission in a state in which first protruding portions of the first ring mesh with dog teeth of the transmission gear, when a force is applied to the second ring to force the second ring to be moved away from the transmission gear in an axial direction of the shaft, the second ring is moved away from the transmission gear in the axial direction. In this instance, the meshing engagements of the first protruding portions of the first ring with the dog teeth of the transmission gear are maintained by a resistance force (friction resistance force) owing to the meshing engagements, while the first and second rings are separated from each other in the axial direction with the elastic member being elastically deformed. Then, when another transmission gear (through which a drive force is to be transmitted after the shifting action) is placed in a drive-force transmittable state and the above-described resistance force owing to the meshing engagements established before the execution of the shifting action becomes smaller than an elastic restoring force generated by the elastic deformation of the elastic member of the switching mechanism, the first ring is moved by the elastic restoring force of the elastic member whereby the meshing engagements of the first protruding portions of the first ring with the dog teeth of the transmission gear are released.

SUMMARY OF THE INVENTION

By the way, there is a risk that the switching mechanism could not be positioned in a desired position, for example, in the event of a failure of the elastic member connecting the first and second rings. Therefore, it is necessary to detect a failure of the vehicle transmission, which results from such a failure of the switching mechanism or a failure of a mechanism that operates the switching mechanism. It might be possible to detect the failure in an arrangement in which a position sensor is provided for each of the first and second rings. However, in such an arrangement, a large number of the position sensors would be required whereby the manufacturing cost would be increased.

The present invention was made in view of the background art described above. It is therefore an object of the present invention to provide a control apparatus for a vehicle transmission that is provided with first and second rings and an elastic member connecting the first and second rings, wherein the control apparatus is capable of detecting a failure of the transmission without the manufacturing cost being increased.

The object indicated above is achieved according to the following aspects of the present invention.

According to a first aspect of the invention, there is provided a control apparatus for a vehicle transmission that includes (i) a shaft, (ii) a plurality of transmission gears which are disposed on the shaft, (iii) a switching mechanism which is disposed to be adjacent to one of the transmission gears in an axial direction of the shaft and which is to be switched between a connecting state in which the one of the transmission gears is rotatable integrally with the shaft and a disconnecting state in which the one of the transmission gears is rotatable relative to the shaft, (iv) a shift fork which is configured to move the switching mechanism in the axial direction and (v) a shift barrel that is to be rotated to position the shift fork in a position that is dependent on a rotation angle of the shift barrel, in the axial direction. The switching mechanism includes (iii-1) first and second rings which are disposed on the shaft so as to be arranged in the axial direction and which are unrotatable relative to the shaft and movable relative to the shaft in the axial direction and (iii-2) an elastic member which is disposed between the first and second rings in the axial direction and connects the first and second rings. The control apparatus comprises a failure determining portion configured to determine that a failure occurs in the vehicle transmission, when a reaction-force-related value related to a reaction force that acts on the shift barrel during rotation of the shift barrel is deviated from a predetermined range. It is noted that the switching mechanism may be switched between the connecting state and the disconnecting state, by being moved in the axial direction by the shift fork, and the control apparatus may further comprise a switching control portion configured, when determining that a shifting action is to be executed in the vehicle transmission, to switch the switching mechanism from one of the connecting state and the disconnecting state to the other of the connecting state and the disconnecting state, by rotating the shift barrel in a direction that causes the switching mechanism to be moved by the shift fork in a direction that causes the switching mechanism to be switched from the one of the connecting state and the disconnecting state to the other of the connecting state and the disconnecting state. It is further noted that the vehicle transmission may further include a shift barrel actuator configured to rotate the shift barrel, and the switching control portion may be configured, when the shift barrel is rotated, to control the shift barrel actuator based on a deviation of a detected value of the rotation angle of the shift barrel from a target value of the rotation angle, such that the deviation is reduced.

According to a second aspect of the invention, in the control apparatus according to the first aspect of the invention, the failure determining portion is configured, when determining that the failure occurs in the vehicle transmission, to determine at least one factor of the failure, depending on whether the reaction-force-related value is larger than an upper limit value of the predetermined range or is smaller than a lower limit value of the predetermined range.

According to a third aspect of the invention, in the control apparatus according to the second aspect of the invention, the failure determining portion is configured to determine that a breakage of the elastic member, a breakage or wear of the shift fork and/or a breakage or wear of the shift barrel occur in the vehicle transmission, when the reaction-force-related value is smaller than the lower limit value of the predetermined range.

According to a fourth aspect of the invention, in the control apparatus according to the second or third aspect of the invention, the failure determining portion is configured to determine that a drawback that the elastic member is not restored from an elastic deformation thereof and/or an increase of resistance against sliding movement of the switching mechanism relative to the shaft occur in the vehicle transmission, when the reaction-force-related value is larger than the upper limit value of the predetermined range.

According to a fifth aspect of the invention, in the control apparatus according to any one of the first through fourth aspects of the invention, the failure determining portion is configured to detect the reaction-force-related value during a period of switching of the switching mechanism from the connecting state to the disconnecting state in execution of a shifting action of the transmission in which the switching mechanism is switched from the connecting state to the disconnecting state.

According to a sixth aspect of the invention, in the control apparatus according to any one of the first through fourth aspects of the invention, the failure determining portion is configured to detect the reaction-force-related value during a period of switching of the switching mechanism from the disconnecting state to the connecting state in execution of a shifting action of the transmission in which the switching mechanism is switched from the disconnecting state to the connecting state.

According to a seventh aspect of the invention, in the control apparatus according to any one of the first through sixth aspects of the invention, the failure determining portion is configured to calculate an impulse as the reaction-force-related value, and is configured, when the calculated impulse is deviated from the predetermined range, to determine that the failure occurs in the vehicle transmission.

According to an eighth aspect of the invention, in the control apparatus according to any one of the first through seventh aspects of the invention, the first ring is disposed in a position adjacent to the one of the transmission gears in the axial direction of the shaft, wherein the second ring is disposed on one of opposite sides of the first ring, which is remote from the one of the transmission gears, in the axial direction, wherein the first ring is provided with first meshing teeth which protrude toward the one of the transmission gears, wherein the second ring is provided with second meshing teeth which pass through the first ring and which protrude toward the one of the transmission gears, such that the first meshing teeth and the second meshing teeth are arranged in a circumferential direction of the shaft, and wherein the one of the transmission gears is provided with gear-side meshing teeth that are to be brought into meshing engagements with the first and second meshing teeth of the first and second rings.

In the control apparatus according to the first aspect of the invention, when the reaction-force-related value related to the reaction force acting on the shift barrel during rotation of the shift barrel is deviated from the predetermined range, it is determined that a failure occurs in the transmission. It is therefore possible to detect or determine occurrence of the failure of the transmission, even without provision of sensors or other devices for detecting the failure.

In the control apparatus according to the second aspect of the invention, it is possible to determine at least one factor of the failure, depending on whether the reaction-force-related value is larger than the upper limit value of the predetermined range or is smaller than the lower limit value of the predetermined range.

In the control apparatus according to the third aspect of the invention, it is possible to determine that the breakage of the elastic member, the breakage or wear of the shift fork and/or the breakage or wear of the shift barrel occur in the vehicle transmission, when the reaction-force-related value is smaller than the lower limit value of the predetermined range.

In the control apparatus according to the fourth aspect of the invention, it is possible to determine that the drawback that the elastic member is not restored from an elastic deformation thereof and/or the increase of resistance against sliding movement of the switching mechanism relative to the shaft occur in the vehicle transmission, when the reaction-force-related value is larger than the upper limit value of the predetermined range.

In the control apparatus according to the fifth aspect of the invention, since a resistance force is generated owing to an elastic restoring force generated by the elastic member that is elastically deformed in the period of switching of the switching mechanism from the connecting state to the disconnecting state in execution of a shifting action of the transmission, it is possible to determine occurrence of the failure, by detecting the reaction-force-related value.

In the control apparatus according to the sixth aspect of the invention, since a resistance force is generated owing to an elastic restoring force generated by the elastic member that is elastically deformed in the period of switching of the switching mechanism from the disconnecting state to the connecting state in execution of a shifting action of the transmission, it is possible to determine occurrence of the failure, by detecting the reaction-force-related value.

In the control apparatus according to the seventh aspect of the invention, the impulse during rotation of the shift barrel is calculated, and it is possible to determine occurrence of the failure when the calculated impulse is deviated from the predetermined range.

In the control apparatus according to the eighth aspect of the invention, the failure determination can be made for the vehicle transmission in which the meshing teeth of the switching mechanism (that are to mesh with the gear-side meshing teeth) are constituted by the first meshing teeth of the first ring and the second meshing teeth of the second ring, thereby reducing plays among the meshing teeth when the meshing teeth of the switching mechanism mesh with the gear-side meshing teeth, and in which, even if the second meshing teeth collide with the gear-side meshing teeth in process of the meshing engagements of the dog teeth of the switching mechanism with the gear-side meshing teeth, a shock due to the collisions can be reduced by elastic deformation of the elastic member.

DETAILED DESCRIPTION OF PREFERRED EMBODIMENTS

Hereinafter, preferred embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
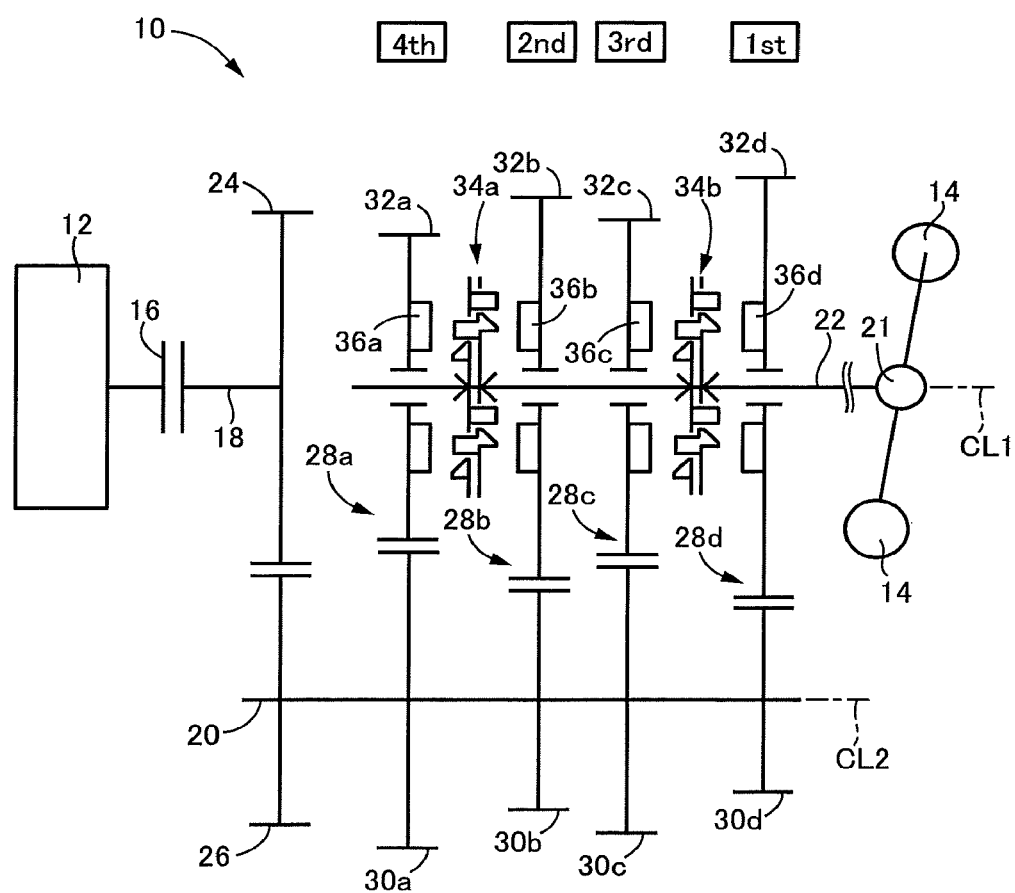
FIG. 1 is a view schematically showing a construction of a vehicle transmission according to an embodiment of the invention.

FIG. 1 is a view schematically showing a construction of a vehicle transmission 10 according to an embodiment of the invention. The transmission 10 is a two-parallel-axes transmission which is provided on a drive-force transmitting path between an engine 12 and drive wheels 14 of a vehicle and which is configured to establish a plurality of gear positions (four gear positions in the present embodiment), by changing the speed of a rotation inputted from the engine 12 by predetermined gear ratios γ.

The transmission 10 includes: an input shaft 18 that is connected in a drive-force transmittable manner to the engine 12 through a clutch 16 and is to be rotated about a first axis CL1; a counter shaft 20 that is disposed to be rotatable about a second axis CL2 parallel with the first axis CL1; and an output shaft 22 that is disposed in series with the input shaft 18 and is rotatable about the first axis CL1. The output shaft 22 is connected in a drive-force transmittable manner to the drive wheels 14 thorough a differential device 21 and other elements. It is noted that the output shaft 22 corresponds to "a shaft" recited in the appended claims.

The transmission 10 further includes: an input gear 24 disposed on the input shaft 18; and an intermediate gear 26 disposed on the counter shaft 20 and meshing with the input gear 24. Moreover, the transmission 10 includes a first pair of gears 28a, a second pair of gears 28b, a third pair of gears 28c and a fourth pair of gears 28d which are arranged in this order in a direction which is parallel to an axial direction of the output shaft 22 and which is a direction away from the engine 12.

The first pair of gears 28a is constituted by a first counter gear 30a which is fixedly disposed on the counter shaft 20 and unrotatable relative to the counter shaft 20, and a first transmission gear 32a which is disposed on the output shaft 22 and rotatable relative to the output shaft 22 and which meshes with the first counter gear 30a. The first transmission gear 32a is provided with first-gear dog teeth 36a that protrude toward a first switching mechanism 34a in the axial direction of the output shaft 22.

The second pair of gears 28b is constituted by a second counter gear 30b which is fixedly disposed on the counter shaft 20 and unrotatable relative to the counter shaft 20, and a second transmission gear 32b which is disposed on the output shaft 22 and rotatable relative to the output shaft 22 and which meshes with the second counter gear 30b. The second transmission gear 32b is provided with second-gear dog teeth 36b that protrude toward the first switching mechanism 34a in the axial direction of the output shaft 22.

The third pair of gears 28c is constituted by a third counter gear 30c which is fixedly disposed on the counter shaft 20 and unrotatable relative to the counter shaft 20, and a third transmission gear 32c which is disposed on the output shaft 22 and rotatable relative to the output shaft 22 and which meshes with the third counter gear 30c. The third transmission gear 32c is provided with third-gear dog teeth 36c that protrude toward a second switching mechanism 34b in the axial direction of the output shaft 22.

The fourth pair of gears 28d is constituted by a fourth counter gear 30d which is fixedly disposed on the counter shaft 20 and unrotatable relative to the counter shaft 20, and a fourth transmission gear 32d which is disposed on the output shaft 22 and rotatable relative to the output shaft 22 and which meshes with the fourth counter gear 30d. The fourth transmission gear 32d is provided with fourth-gear dog teeth 36d that protrude toward the second switching mechanism 34b in the axial direction of the output shaft 22. It is noted that the above-described first-gear dog teeth 36a, second-gear dog teeth 36b, third-gear dog teeth 36c and fourth-gear dog teeth 36d correspond to "gear-side meshing teeth" recited in the appended claims.

The transmission 10 includes the first and second switching mechanisms 34a, 34b, wherein the first switching mechanism 34a is disposed on the output shaft 22 and located between the first transmission gear 32a and the second transmission gear 32b in the axial direction of the output shaft 22, and the second switching mechanism 34b is disposed on the output shaft 22 and located between the third transmission gear 32c and the fourth transmission gear 32d in the axial direction of the output shaft 22. It is noted that each of the first and second switching mechanisms 34a, 34b correspond to "a switching mechanism" recited in the appended claims. In the following description, each of the first and second switching mechanisms 34a, 34b will be simply referred to as a switching mechanism 34, where they are not particularly distinguished from each other.

The first switching mechanism 34a is disposed in a position which is adjacent to the first and second transmission gears 32a, 32b, namely, which is between the first and second transmission gears 32a, 32b, in the axial direction of the output shaft 22, and serves as a connecting/disconnecting mechanism configured to selectively connect and disconnect between the first transmission gear 32a and the output shaft 22 and between the second transmission gear 32b and the output shaft 22. With the first switching mechanism 34a being moved in the axial direction of the output shaft 22, the first switching mechanism 34a is switched between a connecting state in which the first transmission gear 32a or second transmission gear 32b is connected to the output shaft 22 so as to be rotatable integrally with the output shaft 11 and a disconnecting state in which the first transmission gear 32a and the second transmission gear 32b are disconnected from the output shaft 22 so as to be rotatable relative to the output shaft 22.

When the first transmission gear 32a is connected to the output shaft 22 by the first switching mechanism 34a, the drive force is transmittable between the counter shaft 20 and the output shaft 22 through the first pair of gears 28a whereby a fourth gear position 4th is established. When the second transmission gear 32b is connected to the output shaft 22 by the first switching mechanism 34a, the drive force is transmittable between the counter shaft 20 and the output shaft 22 through the second pair of gears 28b whereby a second gear position 2nd is established.

The second switching mechanism 34b is disposed in a position which is adjacent to the third and fourth transmission gears 32c, 32d, namely, which is between the third and fourth transmission gears 32c, 32d, in the axial direction of the output shaft 22, and serves as a connecting/disconnecting mechanism configured to selectively connect and disconnect between the third transmission gear 32c and the output shaft 22 and between the fourth transmission gear 32d and output shaft 22. With the second switching mechanism 34b being moved in the axial direction of the output shaft 22, the second switching mechanism 34b is switched between a connecting state in which the third transmission gear 32c or fourth transmission gear 32d is connected to the output shaft 22 so as to be rotatable integrally with the output shaft 11 and a disconnecting state in which the third transmission gear 32c and the fourth transmission gear 32d are disconnected from the output shaft 22 so as to be rotatable relative to the output shaft 22.

When the third transmission gear 32c is connected to the output shaft 22 by the second switching mechanism 34b, the drive force is transmittable between the counter shaft 20 and the output shaft 22 through the third pair of gears 28c whereby a third gear position 3rd is established. When the fourth transmission gear 32d is connected to the output shaft 22 by the second switching mechanism 34b, the drive force is transmittable between the counter shaft 20 and the output shaft 22 through the fourth pair of gears 28d whereby a first gear position 1st is established.

Figure 2:
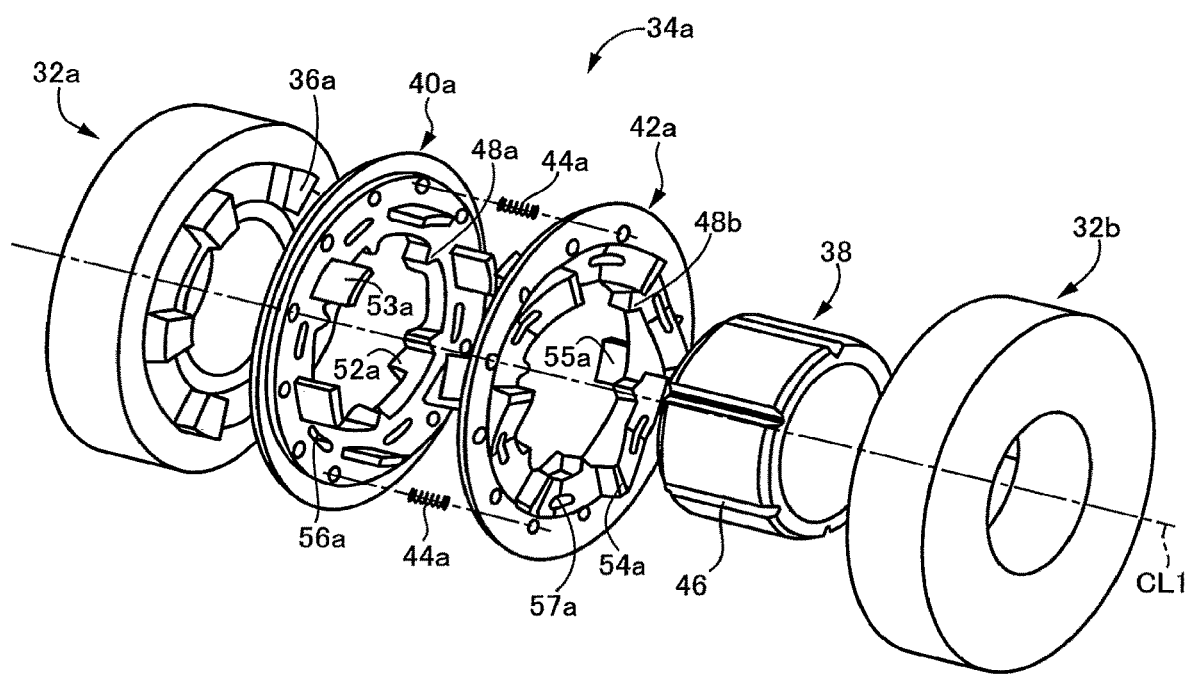
FIG. 2 is an exploded perspective view for explaining a construction of a first switching mechanism shown in FIG. 1.

There will be described a construction of the switching mechanism 34. FIG. 2 is an exploded perspective view for explaining a construction of the first switching mechanism 34a. The second switching mechanism 34b has substantially the same construction as the first switching mechanism 34a shown in FIG. 2, so that description of the second switching mechanism 34b is not provided.

The first switching mechanism 34a includes: first and second dog rings 40a, 42a disposed on an outer peripheral side of a hub sleeve 38, which is fitted on the output shaft 22 so as to be unrotatable and axially movable relative to the output shaft 22; and a plurality of springs 44a disposed between the first and second dog rings 40a, 42a in the axial direction of the output shaft 22. The first dog ring 40a corresponds to "a first ring" recited in the appended claims where it is interpreted that the first transmission gear 32a corresponds to "one of the transmission gears" recited in the appended claims, and corresponds "a second ring" recited in the appended claims where it is interpreted that the second transmission gear 32b corresponds to "one of the transmission gears" recited in the appended claims. Further, the second dog ring 42a corresponds to "a second ring" recited in the appended claims where it is interpreted that the first transmission gear 32a corresponds to "one of the transmission gears" recited in the appended claims, and corresponds "a first ring" recited in the appended claims where it is interpreted that the second transmission gear 32b corresponds to "one of the transmission gears" recited in the appended claims.

The hub sleeve 38, which has a cylindrical tubular shape, is fitted on the output shaft 22 so as to be unrotatable and axially movable relative to the output shaft 22, for thereby serving as a part of the output shaft 22. The hub sleeve 38 has a plurality of fitting grooves 46 that are provided in an outer circumferential surface of the hub sleeve 38 and extend in parallel with the axial direction of the output shaft 22

The first and second dog rings 40a, 42a are interposed between the first and second transmission gears 32a, 32b in the axial direction of the output shaft 22 (hereinafter the term "axial direction" means the axial direction of the output shaft 22, unless otherwise specified), such that the first dog ring 40a is located in a position adjacent to the first transmission gear 32a in the axial direction while the second dog ring 42a is located in a position adjacent to the second transmission gear 32b in the axial direction. In other words, the first dog ring 40a is located on one of opposite sides, in the axial direction, of the second dog ring 42a, which is remote from the second transmission gear 32b, while the second dog ring 42a is located on one of opposite sides, in the axial direction, of the first dog ring 40a, which is remote from the first transmission gear 32a.

The first dog ring 40a has an annular shape, and is provided with a plurality of inward protrusions 48a which are provided in an inner peripheral portion of the first dog ring 40a and protrude radially inwardly so as to fit in the respective fitting grooves 46 of the hub sleeve 38. With each of the inward protrusions 48a and a corresponding one of the fitting grooves 46 being in fitting engagement with each other, the first dog ring 40a is unrotatable and movable in the axial direction relative to the hub sleeve 38 and the output shaft 22.

The first dog ring 40a is further provided with a plurality of first meshing teeth 52a that protrude from an opposed surface of the first dog ring 40a opposed to the first transmission gear 32a in the axial direction, toward the first transmission gear 32a. The first meshing teeth 52a are located in such positions and have such shapes, which make it possible to cause the first meshing teeth 52a to mesh with the respective first-gear dog teeth 36a of the first transmission gear 32a. It is noted that the first meshing teeth 52a correspond to "first meshing teeth" recited in the appended claims.

The first dog ring 40a is still further provided with a plurality of second meshing teeth 53a that protrude from an opposed surface of the first dog ring 40a opposed to the second transmission gear 32b in the axial direction, toward the second transmission gear 32b. The second meshing teeth 53a are located in such positions and have such shapes, which make it possible to cause the second meshing teeth 53a to pass through respective through-holes 57a (described below) of the second dog ring 42a and mesh with the second-gear dog teeth 36b of the second transmission gear 32b, in a connected state in which the first and second dog rings 40a, 42a are connected to each other. It is noted that the second meshing teeth 53a correspond to "second meshing teeth" recited in the appended claims.

The first dog ring 40a has a plurality of through-holes 56a formed through the first dog ring 40a and opening in axially opposite end faces of the first dog ring 40a. The through-holes 56a are located in such positions and have such shapes, which make it possible to cause fourth meshing teeth 55a (described below) of the second dog ring 42a to pass through the respective through-holes 56a, in the connected state in which the first and second dog rings 40a, 42a are connected to each other.

The second dog ring 42a has an annular shape, and is provided with a plurality of inward protrusions 48b which are provided in an inner peripheral portion of the second dog ring 42a and protrude radially inwardly so as to fit in the respective fitting grooves 46 of the hub sleeve 38. With each of the inward protrusions 48b and a corresponding one of the fitting grooves 46 being in fitting engagement with each other, the second dog ring 42a is unrotatable and movable in the axial direction relative to the hub sleeve 38 and the output shaft 22.

The second dog ring 42a is further provided with a plurality of third meshing teeth 54a that protrude from an opposed surface of the second dog ring 42a opposed to the second transmission gear 32b in the axial direction, toward the second transmission gear 32b. The third meshing teeth 54a are located in such positions and have such shapes, which make it possible to cause the third meshing teeth 54a to mesh with the respective second-gear dog teeth 36b of the second transmission gear 32b. It is noted that the third meshing teeth 54a corresponds to "first meshing teeth" recited in the appended claims.

The second dog ring 42a is still further provided with a plurality of fourth meshing teeth 55a that protrude from an opposed surface of the second dog ring 42a opposed to the first transmission gear 32a in the axial direction, toward the first transmission gear 32a. The fourth meshing teeth 55a are located in such positions and have such shapes, which make it possible to cause the fourth meshing teeth 55a to pass through the respective through-holes 56a of the first dog ring 40a and mesh with the first-gear dog teeth 36a of the first transmission gear 32a, in the connected state in which the first and second dog rings 40a, 42a are connected to each other. It is noted that the fourth meshing teeth 55a correspond to "second meshing teeth" recited in the appended claims.

The second dog ring 42a has a plurality of through-holes 57a formed through the second dog ring 42a and opening in axially opposite end faces of the second dog ring 42a. The through-holes 57a are located in such positions and have such shapes, which make it possible to cause the second meshing teeth 53a of the first dog ring 40a to pass through the respective through-holes 57a, in the connected state in which the first and second dog rings 40a, 42a are connected to each other.

The first and second dog rings 40a, 42a are connected to each other through a plurality of springs 44a each of which corresponds to "an elastic member" recited in the appended claims. When being connected to each other, the first and second dog rings 40a, 42a are in contact, at their respective surfaces opposed to each other, with each other. In this instance, the first meshing teeth 52a of the first dog ring 40a and the fourth meshing teeth 55a of the second dog ring 42a are arranged in a circumferential direction of the output shaft 22, as seen from side of the first transmission gear 32a. Further, the third meshing teeth 54a of the second dog ring 42a and the second meshing teeth 53a of the first dog ring 40a are arranged in the circumferential direction of the output shaft 22, as seen from side of the second transmission gear 32b.

In the first switching mechanism 34a constructed as described above, when the first and second dog rings 40a, 42a are moved toward the first transmission gear 32a in the axial direction, the first meshing teeth 52a or fourth meshing teeth 55a are brought into meshing engagement with the respective first-gear dog teeth 36a whereby the first transmission gear 32a is connected to the output shaft 22. Further, when the first and second dog rings 40a, 42a are moved toward the second transmission gear 32b in the axial direction, the third meshing teeth 54a or second meshing teeth 53a are brought into meshing engagement with the respective second-gear dog teeth 36b whereby the second transmission gear 32b is connected to the output shaft 22.

In a state in which the first meshing teeth 52a or fourth meshing teeth 55a are in meshing engagement with the respective first-gear dog teeth 36a, the first and fourth meshing teeth 52a, 55a are received in each circumferentially adjacent pair of the first-gear dog teeth 36a. With the first and fourth meshing teeth 52a, 55a being received in a space between each circumferentially adjacent pair of the first-gear dog teeth 36a, play between each of the first-gear dog teeth 36a and a corresponding one of the first meshing teeth 52a and/or play between each of the first-gear dog teeth 36a and a corresponding one of the fourth meshing teeth 55a are reduced.

On the other hand, due to the reduction of the play between each of the first-gear dog teeth 36a and a corresponding one of the first meshing teeth 52a and/or the reduction of the play between each of the first-gear dog teeth 36a and a corresponding one of the fourth meshing teeth 55a, a teeth collision of the first-gear dog teeth 36a with the first meshing teeth 52a and/or with the fourth meshing teeth 55a in process of the meshing engagement could be an issue. In the present embodiment, when the fourth meshing teeth 55a collide with the first-gear dog teeth 36a, the springs 44a connecting between the first and second dog rings 40a, 42a are elastically deformed to reduce a shock caused by the collision. Thus, the teeth collision issue is caused only by collision of the first meshing teeth 52a with the first-gear dog teeth 36a, so that the teeth collision issue is unlikely to be serious.

In a state in which the third meshing teeth 54a or second meshing teeth 53a are in meshing engagement with the respective second-gear dog teeth 36b, the third and second meshing teeth 54a, 53a are received in each circumferentially adjacent pair of the second-gear dog teeth 36b. With the third and second meshing teeth 54a, 53a being received in a space between each circumferentially adjacent pair of the second-gear dog teeth 36b, play between each of the second-gear dog teeth 36b and a corresponding one of the third meshing teeth 54a and/or play between each of the second-gear dog teeth 36b and a corresponding one of the second meshing teeth 53a are reduced.

On the other hand, due to the reduction of the play between each of the second-gear dog teeth 36b and a corresponding one of the third meshing teeth 54a and/or the reduction of the play between each of the second-gear dog teeth 36b and a corresponding one of the second meshing teeth 53a, a teeth collision of the second-gear dog teeth 36b with the third meshing teeth 54a and/or with the second meshing teeth 53a in process of the meshing engagement could be an issue. In the present embodiment, when the second meshing teeth 53a collide with the second-gear dog teeth 36b, the springs 44a connecting between the first and second dog rings 40a, 42a are elastically deformed to reduce a shock caused by the collision. Thus, the teeth collision issue is caused only by collision of the third meshing teeth 54a with the second-gear dog teeth 36b, so that the teeth collision issue is unlikely to be serious.

Figure 3:
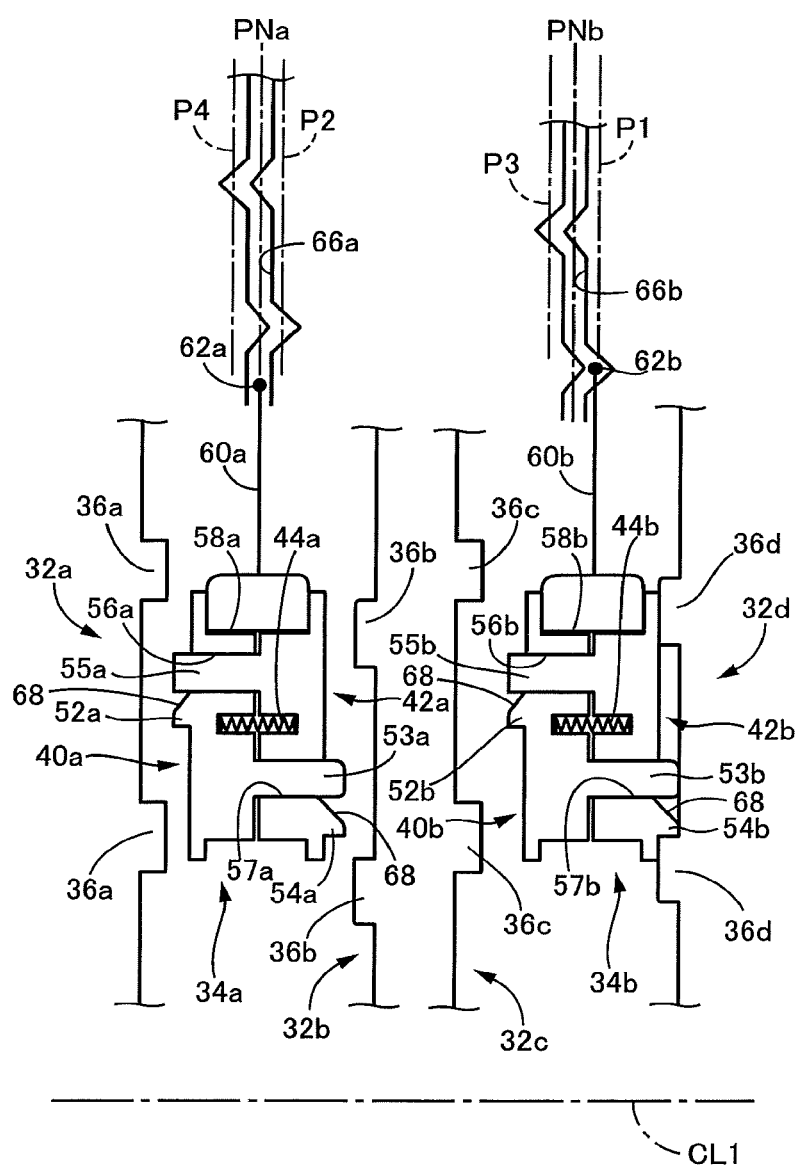
FIG. 3 is a view schematically showing an operation state of each of first and second switching mechanisms during running of a vehicle with the transmission of FIG. 1 being placed in a first gear position.

There will be described shifting actions in the transmission 10. FIG. 3 is a view schematically showing an operation state of each of first and second switching mechanisms during running of a vehicle with the transmission 10 being placed in a first gear position 1st. In FIG. 3, a horizontal direction (in the drawing sheet of FIG. 3) corresponds to the axial direction of the output shaft 22 while a vertical direction (in the drawing sheet of FIG. 3) corresponds to a direction of rotation of the output shaft 22. Further, in FIG. 3, a left-side portion corresponds to the first switching mechanism 34a while a right-side portion corresponds to the second switching mechanism 34b. In FIG. 3, a part of each of the first and second switching mechanisms 34a, 34b is schematically represented with its outer periphery being developed onto a plane.

On opposite sides of the first switching mechanism 34a, some of the first-gear dog teeth 36a of the first transmission gear 32a and some of the second-gear dog teeth 36b of the second transmission gear 32b are represented with the dog teeth 36a, 36b being developed onto on a plane. On opposite sides of the second switching mechanism 34b, some of the third-gear dog teeth 36c of the third transmission gear 32c and some of the fourth-gear dog teeth 36d of the fourth transmission gear 32d are represented with the dog teeth 36c, 36d being developed onto on a plane.

Regarding the first switching mechanism 34a shown in FIG. 3, a left-side member (as seen in the drawing sheet of FIG. 3) represents the first dog ring 40a while a right-side member (as seen in the drawing sheet of FIG. 3) represents the second dog ring 40b. Each of the first and second dog rings 40a, 42a is biased or forced, by the springs 44a, in a direction toward the other, i.e., in a direction that causes each one of the dog rings 40a, 42a to be brought into contact with the other of the dog rings 40a, 42a.

The first dog ring 40a is provided with the first meshing teeth 52a that protrude toward the first transmission gear 32a and the second meshing teeth 53a that pass through the respective through-holes 57a of the second dog ring 42a and protrude toward the second transmission gear 32b. The second dog ring 42a is provided with the third meshing teeth 54a that protrude toward the second transmission gear 32b and the fourth meshing teeth 55a that pass through the respective through-holes 56a of the first dog ring 40a and protrude toward the first transmission gear 32a.

In a state in which the first and second dog rings 40a, 42a are connected to each other, an annular groove 58a is defined in an outer circumferential surface of the first switching mechanism 34a, and a first shift fork 60a is fitted in the annular groove 58a. Therefore, with movement of the first shift fork 60a in the axial direction, the first switching mechanism 34a is also moved in the axial direction. The first shift fork 60a is provided with an engaged pin 62a which is formed integrally with the first shift fork 60a and which is represented by black circle in FIG. 3. The engaged pin 62a is engaged in an engaging portion of a first shift groove 66a (described below) that is provided in an outer circumferential surface of the shift barrel 64.

The first shift groove 66a is provided to define positions of the engaged pin 62a and the first shift fork 60a in the axial direction. The first shift groove 66a has a shape that varies depending on a rotation angle θbr1 of the shift barrel 64, as shown in FIG. 3. Namely, a position of the first shift groove 66a in the axial direction is changed in a circumferential direction of the shift barrel 64. Therefore, with rotation of the shift barrel 64, the shape of the first shift groove 66a in which the engaged pin 62a is engaged, is changed, namely, a position of the above-described engaging portion of the first shift groove 66a in the axial direction is changed. Specifically, with the first shift fork 60a being guided in the first shift groove 66a, the first shift fork 60a can be moved in the axial direction so as to be positioned in a fourth-gear establishing position (P4) for establishing the fourth gear position 4th, a neutral-state establishing position (PNa) for cutting off transmission of the drive force and a second-gear establishing position (P2) for establishing the second gear position 2nd.

Regarding the second switching mechanism 34b shown in FIG. 3, its construction is not basically different from the above-described construction of the first switching mechanism 34a. The second switching mechanism 34b includes: first and second dog rings 40b, 42b disposed on the outer peripheral side of the hub sleeve 38; and a plurality of springs 44b connecting the first and second dog rings 40b, 42b in the axial direction of the output shaft 22. The first dog ring 40b is provided with a plurality of first meshing teeth 52b that protrude toward the third transmission gear 32c and a plurality of second meshing teeth 53b that pass through respective through-holes 57b of the second dog ring 42b and protrude toward the fourth transmission gear 32d. The second dog ring 42b is provided with a plurality of third meshing teeth 54b that protrude toward the fourth transmission gear 32d and a plurality of fourth meshing teeth 55b that pass through respective through-holes 56b of the first dog ring 40b and protrude toward the third transmission gear 32c. Further, each of the first meshing teeth 52a, 52b and third meshing teeth 54a, 54b has an inclined surface 68. The first dog ring 40b corresponds to "a first ring" recited in the appended claims where it is interpreted that the third transmission gear 32c corresponds to "one of the transmission gears" recited in the appended claims, and corresponds "a second ring" recited in the appended claims where it is interpreted that the fourth transmission gear 32d corresponds to "one of the transmission gears" recited in the appended claims. Further, the second dog ring 42b corresponds to "a second ring" recited in the appended claims where it is interpreted that the third transmission gear 32c corresponds to "one of the transmission gears" recited in the appended claims, and corresponds "a first ring" recited in the appended claims where it is interpreted that the fourth transmission gear 32d corresponds to "one of the transmission gears" recited in the appended claims.

In the following description, the first dog rings 40a, 40b will be simply referred to as first dog rings 40 where they are not particularly distinguished from each other. The second dog rings 42a, 42b will be simply referred to as second dog rings 42 where they are not particularly distinguished from each other. The springs 44a, 44b will be simply referred to as springs 44 where they are not particularly distinguished from each other. The first meshing teeth 52a, 52b will be simply referred to as first meshing teeth 52 where they are not particularly distinguished from each other. The second meshing teeth 53a, 53b will be simply referred to as second meshing teeth 53 where they are not particularly distinguished from each other. The third meshing teeth 54a, 54b will be simply referred to as third meshing teeth 54 where they are not particularly distinguished from each other. The fourth meshing teeth 55a, 55b will be simply referred to as fourth meshing teeth 55 where they are not particularly distinguished from each other. It is noted that the first meshing teeth 52a, 52b and third meshing teeth 54a, 54b correspond to "first dog teeth" recited in the appended claims, the second meshing teeth 53a, 53b and fourth meshing teeth 55a, 55b correspond to "second meshing teeth" recited in the appended claims, and each of the spring 44a, 44b corresponds to "an elastic member" recited in the appended claims.

In a state in which the first and second dog rings 40b, 42b are connected to each other, an annular groove 58b is defined in an outer circumferential surface of the second switching mechanism 34b, and a second shift fork 60b is fitted in the annular groove 58b. Therefore, with movement of the second shift fork 60b in the axial direction, the second switching mechanism 34b is also moved in the axial direction. The second shift fork 60b is provided with an engaged pin 62b which is formed integrally with the second shift fork 60b and which is represented by black circle in FIG. 3. The engaged pin 62b is engaged in an engaging portion of a second shift groove 66b that is provided in the outer circumferential surface of the shift barrel 64. It is noted that each of the first and second shift forks 60a, 60b corresponds to "a shift fork" recited in the appended claims. In the following description, the first and second shift forks 60a, 60b will be simply referred to as shift forks 60 where they are not particularly distinguished from each other.

The second shift groove 66b is provided to define positions of the engaged pin 62b and the second shift fork 60b in the axial direction. The second shift groove 66b has a shape that varies depending on the rotation angle θbrl of the shift barrel 64, as shown in FIG. 3. Namely, a position of the second shift groove 66b in the axial direction is changed in the circumferential direction of the shift barrel 64. Therefore, with rotation of the shift barrel 64, the shape of the second shift groove 66b in which the engaged pin 62b is engaged, is changed, namely, a position of the above-described engaging portion of the second shift groove 66b in the axial direction is changed. Specifically, with the second shift fork 60b being guided in the second shift groove 66b, the second shift fork 60b can be moved in the axial direction so as to be positioned in a third-gear establishing position (P3) for establishing the third gear position 3rd, a neutral-state establishing position (PNb) for cutting off transmission of the drive force and a first-gear establishing position (P1) for establishing the first gear position 1st.

In FIG. 3, an upward direction (in the drawing sheet of FIG. 3) corresponds to a rotating direction of the output shaft 22 during a forward running of the running. Therefore, during the forward running, the first through fourth transmission gears 32a-32d are rotated in a direction that corresponds to the upward direction (in the drawing sheet of FIG. 3). Further, the first through fourth transmission gears 32a-32d are rotated at respective rotational speeds each of which is dependent on a rotational speed of the engine 12 and a corresponding one of gear ratios γ that are mechanically set to the respective gear positions. Thus, the rotational speeds of the respective transmission gears 32a-32d are different from one another. Specifically, where the rotational speed of the engine 12 is constant, the rotational speed of the first transmission gear 32a corresponding to the fourth gear position 4th is the highest, while the rotational speed of the fourth transmission gear 32d corresponding to the first gear position 1st is the lowest. Further, each of the first and second switching mechanisms 34a, 34b is rotated at a rotational speed that is equal to a rotational speed of the output shaft 22, since the first and second switching mechanisms 34a, 34b are rotated integrally with the output shaft 22.

There will be described the operation state (meshing state) of each of the first and second switching mechanisms 34a, 34b during running of the vehicle with the first gear position 1st being established. During the running with the first gear position 1st being established, as shown in FIG. 3, the first shift fork 60a fitted in the annular groove 58a of the first switching mechanism 34a is guided by the first shift groove 66a so as to be positioned in the neutral-state establishing position (PNa). In this instance, the first through fourth meshing teeth 52a-55a of the first switching mechanism 34a do not mesh with any of the first-gear dog teeth 36a and second-gear dog teeth 36b, so that the first switching mechanism 34a establishes the disconnected state in which the first and second transmission gears 32a, 32b are disconnected from the output shaft 22.

Meanwhile, the second shift fork 60b is fitted in the annular groove 58b of the second switching mechanism 34b is guided by the second shift groove 66b so as to be positioned in the first-gear establishing position (P1). In this instance, as shown in FIG. 3, the third meshing teeth 54b mesh with the respective fourth-gear dog teeth 36d, so that the second switching mechanism 34b is placed in the connecting state in which the fourth transmission gear 32d is connected to the output shaft 22 through the second switching mechanism 34b in a drive-force transmittable manner, whereby the first gear position 1st is established.

Figure 4:
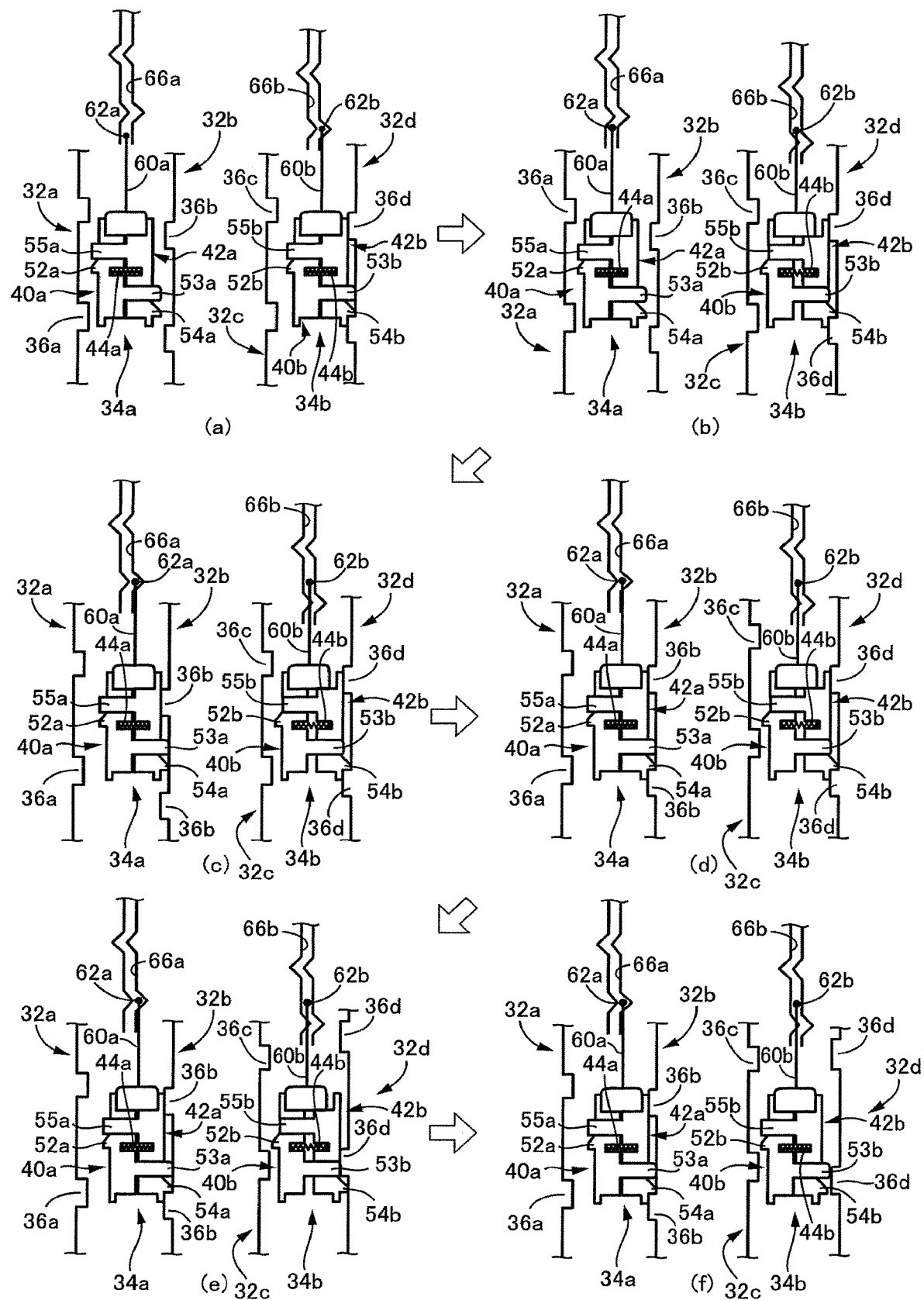
FIG. 4 is a set of views (a)-(f) showing the operation state of each of first and second switching mechanisms in chronological order, namely, in respective stages in process of a shifting action of the transmission from the first gear position to a second gear position.

FIG. 4 is a set of views (a)-(f) showing the operation state of each of first and second switching mechanisms 34a, 34b in chronological order, namely, in respective stages in process of a shifting action of the transmission 10 from the first gear position 1st to the second gear position 2nd. The transmission 10 is placed into the second gear position 2nd after the stages shown in the respective views (a)-(f) of FIG. 4 in the process of the shifting action of the transmission 10 from the first gear position 1st to the second gear position 2nd.

The view (a) of FIG. 4 shows a state of each of the first and second switching mechanisms 34a, 34b during the running with the first gear position 1st being established, namely, before initiation of the shifting action. The state shown in the view (a) of FIG. 4 is the same as the state shown in FIG. 3, so that description thereof is not provided herein.

The view (b) of FIG. 4 shows a state upon initiation of the shift-up action to the second gear position 2nd, and shows a point of time at which the second switching mechanism 34b initiates switching to the disconnecting state. With rotation of the shift barrel 64, the shape of the second shift groove 66b in which the engaged pin 62b of the second shift fork 60b is engaged, is changed whereby the second shift fork 60b is moved in a direction way from the fourth transmission gear 32d in the axial direction (corresponding to the horizontal direction in the drawing sheet of FIG. 4), as shown in the view (b) of FIG. 4. In this instance, the first dog ring 40b is forced by the second shift fork 60b to be moved in a direction away from the second dog ring 42b. The movement of the first dog ring 40b in the direction away from the second dog ring 42b causes the springs 44b to be elastically deformed, and each of the elastically deformed springs 44b generates a biasing force (elastic restoring force) that acts between the first and second dog rings 40b and 42b, such that each one of the first and second dog rings 40b and 42b is forced, by the biasing force of the springs 44b, in a direction toward the other of the first and second dog rings 40b and 42b.

Meanwhile, the drive force is still being transmitted between the third meshing teeth 54b of the second dog ring 40b and the fourth-gear dog teeth 36d of the fourth transmission gear 32d, namely, each of the third meshing teeth 54b and a corresponding one of the fourth-gear dog teeth 36d are in contact with each other at their surfaces, thereby generating a resistance force which is based on a friction between the surfaces of the third meshing teeth 54b and the fourth-gear dog teeth 36d and which acts against the biasing force F of the springs 44b. Thus, owing to the resistance force acting against the biasing force F, the meshing engagements between the third meshing teeth 54b and the fourth-gear dog teeth 36d are maintained for a while. Therefore, in this instance, the first and second dog rings 40b, 42b are separated in the axial direction, as shown in the view (b) of FIG. 4.

The view (c) of FIG. 4 shows a state in which the first switching mechanism 34a is moved toward the second transmission gear 32b in the axial direction for establishing the second gear position 2nd. With rotation of the shift barrel 64, the shape of the first shift groove 66a in which the engaged pin 62a of the first shift fork 60a is engaged, is changed whereby the first shift fork 60a is moved toward the second transmission gear 32b in the axial direction, as shown in the view (c) of FIG. 4. In this instance, there is established a state in which each one of the third meshing teeth 54a of the first dog ring 40a and a corresponding one of the second-gear dog teeth 36b of the second transmission gear 32b can be brought into meshing engagement with each other. It is noted that the view (c) of FIG. 4 shows the state shortly before the meshing engagement is made.

The view (d) of FIG. 4 shows a state immediately after each one of the third meshing teeth 54a of the first dog ring 40a and a corresponding one of the second-gear dog teeth 36b of the second transmission gear 32b are brought into meshing engagement with each other. Since the rotational speed of the second transmission gear 32b corresponding to the second gear position 2nd is higher than the rotational speed of the fourth transmission gear 32d corresponding to the first gear position 1st, the third meshing teeth 54a and the second-gear dog teeth 36b are caused to mesh, as shown in the view (d) of FIG. 4, after the state of the view (c) of FIG. 4. In this instance, as shown in the view (d) of FIG. 4, the third meshing teeth 54a of the first switching mechanism 34a and the second-gear dog teeth 36b of the second transmission gear 32b mesh while the third meshing teeth 54b of the second switching mechanism 34b and the fourth-gear dog teeth 36d of the fourth transmission gear 32d mesh, namely, a currently meshed state is established.

The view (e) of FIG. 4 shows a state in which the engagements of the third meshing teeth 54b of the second switching mechanism 34b and the fourth-gear dog teeth 36d of the fourth transmission gear 32d are released. In the state of the view (d) of FIG. 4, when the third meshing teeth 54a of the first switching mechanism 34a and the second-gear dog teeth 36b of the second transmission gear 32b are brought into engagements, the output shaft 22 and the second transmission gear 32b are rotated integrally with each other, since the rotational speed of the second transmission gear 32b is higher than the rotational speed of the fourth transmission gear 32d. In this instance, the rotational speed of each of the first and second dog rings 40b, 42b of the second switching mechanism 34b, which are rotated integrally with the output shaft 22, become higher than the rotational speed of the fourth transmission gear 32d. Therefore, the first and second dog rings 40b, 42b of the second switching mechanism 34b start to be rotated relative to the fourth transmission gear 32d, so that the engagements of the third meshing teeth 54b of the second dog ring 42b and the fourth-gear dog teeth 36d of the fourth transmission gear 32d are released.

The view (f) of FIG. 4 shows a state in which the second dog ring 42b of the second switching mechanism 34b is moved toward the first dog ring 40b of the second switching mechanism 34b by the biasing force F of the springs 44b. In the state of the view (e) of FIG. 4, when the engagements of the third meshing teeth 54b of the second switching mechanism 34b and the fourth-gear dog teeth 36d of the fourth transmission gear 32d are released, the resistance force generated owing to the friction acting between the third meshing teeth 54b and the fourth-gear dog teeth 36d is eliminated, so that the second dog ring 42b is moved toward the first dog ring 40b by the biasing force F of the springs 44b. In this instance, the second switching mechanism 34b is switched to the disconnecting state in which the meshing teeth 52b-55b of the second switching mechanism 34b do no mesh with any one of the gear dog teeth, and the shift-up action to the second gear position 2nd is completed.

Figure 5:
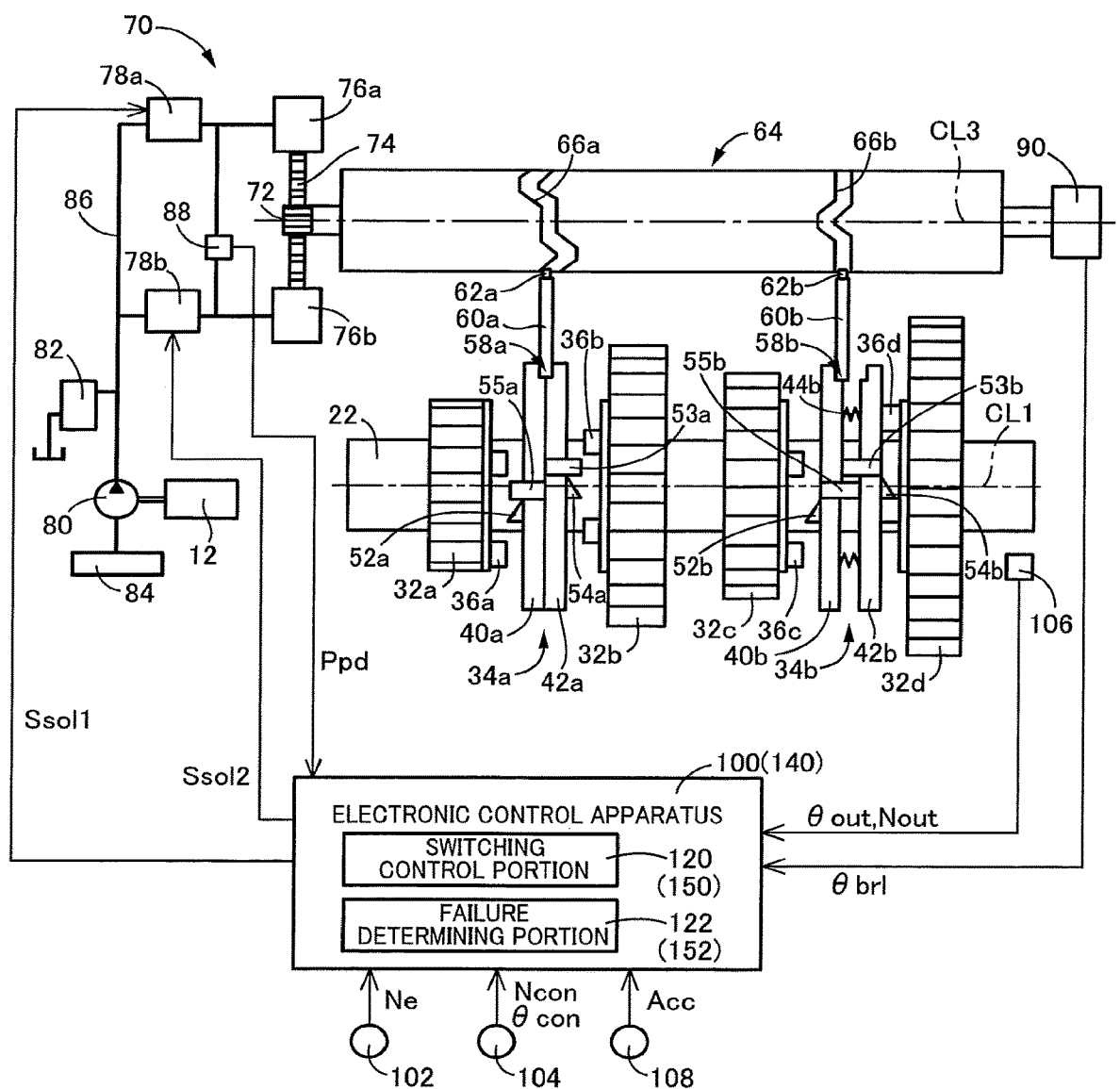
FIG. 5 is a view showing a driving apparatus for driving a shift barrel configured to switch an operation state of each of first and second switching mechanisms, and also a control system for controlling the driving apparatus.

FIG. 5 is a view showing a driving apparatus 70 for driving the shift barrel 64 configured to switch the operation state of each of first and second switching mechanisms 34a, 34b, and also a control system for controlling the driving apparatus 70.

The shift barrel 64, which is constituted principally by a generally cylindrical body, is disposed to be rotatable about a third axis CL3 parallel to the above-described first axis CL1. The above-described first and second shift grooves 66a, 66b are provided in the outer circumferential surface of the shift barrel 64, such that the engaged pin 62a of the first shift fork 60a is engaged in the first shift groove 66a while the engaged pin 62b of the second shift fork 60b is engaged in the second shift groove 66b. Therefore, each of the first and second shift forks 60a, 60b is positioned in a position in the axial direction, which is uniquely defined depending on the rotation angle θbrl of the shift barrel 64.

The shape of each of the first and second shift grooves 66a, 66b is predetermined such that the transmission 10 is sequentially shifted up from the first gear position 1st toward the fourth gear position 4th by rotation of the shift barrel 64 in one of opposite directions and such that the transmission 10 is sequentially shifted down from the fourth gear position 4th toward the first gear position 1st by rotation of the shift barrel 64 in the other of the opposite directions.

The first shift fork 60a is fitted in the annular groove 58a of the first switching mechanism 34a, while the second shift fork 60b is fitted in the annular groove 58b of the second switching mechanism 34b.

Therefore, when the shift barrel 64 is rotated, the engaged pin 62a and the first shift fork 60a are moved in the axial direction in conformity with the shape of the first shift groove 66a, and the engaged pin 62b and the second shift fork 60b are moved in the axial direction in conformity with the shape of the first shift groove 66b.

The driving apparatus 70 includes: a pinion 72 that is to be rotated integrally with the shift barrel 64; a rack 74 that meshes with the pinion 72; a pair of pistons in the form of first and second pistons 76a, 76b that are provided on respective lengthwise opposite sides of the rack 74; a first solenoid valve 78a configured to regulate a flow rate at which a working fluid is to be supplied to the first piston 76a; a second solenoid valve 78b configured to regulate a flow rate at which the working fluid is to be supplied to the second piston 76b; an oil pump 80 configured to eject the working fluid that is to be supplied to the first and second pistons 76a, 76b; and a relief valve 82 that is to be opened when a hydraulic pressure of the working fluid ejected from the oil pump 80 exceeds an allowable value, so as to limit increase of the hydraulic pressure of the working fluid. It is noted that the above-described pinion 72, rack 74, first and second pistons 76a, 76b and first and second solenoid valves 78a, 78b cooperate to constitute "a shift barrel actuator" that is recited in the appended claims.

The oil pump 80 is driven, for example, by the engine 12, so as to pump up the working fluid stored in a reservoir tank 84 and delivery the working fluid to a fluid supply passage 86. The working fluid delivered to the fluid supply passage 86 is supplied to the first piston 76a through the first solenoid valve 78a and also to the second piston 76b through the second solenoid valve 78b. The flow rate of the working fluid supplied to the first piston 76a is regulated by the first solenoid valve 78a, and a stroke amount (displacement amount) of the first piston 76a is increased with increase of the flow rate of the working fluid supplied to the first piston 76a. The flow rate of the working fluid supplied to the second piston 76b is regulated by the second solenoid valve 78b, and a stroke amount (displacement amount) of the second piston 76b is increased with increase of the flow rate of the working fluid supplied to the second piston 76b.

By adjusting the stroke amount of each of the first and second pistons 76a, 76b, it is possible to adjust a position of the rack 74, namely, adjust the rotation angle θbrl of the shift barrel 64 and pinion 74 that meshes with the rack 74.

A pressure difference sensor 88 is provided to detect a pressure difference Ppd (hereinafter referred to as a piston pressure difference Ppd) between two supply passage sections, wherein one of the two supply passage sections is located between the first solenoid valve 78a and the first piston 76a and the other of the two supply passage sections is located between the second solenoid valve 78b and the second piston 76b. Further, a rotation sensor 90 is provided to detect the rotation angle θbrl of the shift barrel 64.

Moreover, an electronic control apparatus 100 is provided to control the operation states of the first and second switching mechanisms 34a, 34b, namely, to execute a shifting control of the transmission 10. The electronic control apparatus 100 includes, for example, a so-called microcomputer incorporating a CPU, a ROM, a RAM and an input-output interface. The CPU executes the shifting control of the transmission 10, by processing various input signals, according to control programs stored in the ROM, while utilizing a temporary data storage function of the RAM.

The electronic control apparatus 100 receives various input signals based on values detected by respective sensors provided in the vehicle. Specifically, the electronic control apparatus 100 receives: an output signal of the rotation sensor 90 indicative of the rotation angle θbrl of the shift barrel 64 which is detected by the rotation sensor 90; an output signal of the pressure difference sensor 88 indicative of the piston pressure difference Pdp which is detected by the pressure difference sensor 88; an output signal of a rotation sensor 102 indicative of an engine rotational speed Ne which is detected by the rotation sensor 102, an output signal of a rotation sensor 104 indicative of a rotation angle θcon and a rotational speed Neon of the counter shaft 20 which are detected by the rotation sensor 104; an output signal of a rotation sensor 106 indicative of a rotation angle θout and an output-shaft rotational speed Nout of the output shaft 22 which are detected by the rotation sensor 106; and an output signal of an accelerator-operation amount sensor 108 indicative of an accelerator operation amount Acc which is an amount of depression (operation) of an accelerator pedal and which is detected by the accelerator-operation amount sensor 108.

Further, the electronic control apparatus 100 generates various output signals which are supplied to various devices such as the first and second pistons 76a, 76b and which include a drive signal Ssol1 for operating the first solenoid valve 78a configured to control the flow rate of the working fluid supplied to the first piston 76a and a drive signal Ssol2 for operating the second solenoid valve 78b configured to control the flow rate of the working fluid supplied to the second piston 76b.

The electronic control apparatus 100 includes a switching control portion 120 for executing a switch control operation for the first and second switching mechanisms 34a, 34b. The switching control portion 120 is configured, when determining that a shifting operation is to be executed to establish a certain gear position during running of the vehicle, for example, to control the first and second switching mechanisms 34a, 34b for executing the shifting operation to establish the certain gear position. It is noted that the determination as to whether a shifting operation is to be executed or not is made, for example, based on a shifting map defined by parameters such as a running speed V of the vehicle and the accelerator operation amount Acc, or in accordance with a shifting operation made by an operator of the vehicle who operates an operating member such as a paddle shift switch.

There will be described, by way of example, a shifting operation to switch from the first gear position 1st to the second gear position 2nd. As described above with reference to FIG. 4, in the shifting operation to switch from the first gear position 1st to the second gear position 2nd, the second switching mechanism 34b is switched from the connected state to the disconnected state while the first switching mechanism 34a is switched from the disconnected state to the connected state. When determining that the shifting action from the first gear position 1st to the second gear position 2nd is to be executed, the switching control portion 120 causes the shift barrel 64 to be rotated in a corresponding one of opposite direction, such that the second shift fork 60b is moved to the neutral-state establishing position PNb so as to place the second switching mechanism 34 in the disconnecting state. The switching control portion 120 executes a feedback control for adjusting an amount of control of each of the first and second solenoid valves 78a, 78b, namely, the flow rate of the working fluid supplied to each of the first and second pistons 76a, 76b, based on a deviation Δθbrl of a detected value of the rotation angle θbrl of the shift barrel 64 (that is continuously detected by the rotation sensor 90) from a target rotation angle θbrl* (that is a target value of the rotation angle θbrl). It is noted that the target rotation angle θbrl* is set to a rotation angle value that causes the second shift fork 60b to be positioned in the neutral-state establishing position PNb. Thus, the second switching mechanism 34b is placed in the state shown in the view (b) of FIG. 4.

Then, when the second shift fork 60b has been moved to the neutral-state establishing position PNb, the switching control portion 120 causes the shift barrel 64 to be further rotated in the same direction such that the first shift fork 60a is moved to the second-gear establishing position P2 whereby the first switching mechanism 34a is placed in the connected state. When the first shift fork 60a has been moved to the second-gear establishing position P2, the state shown in the view (c) of FIG. 4 is established. Then, the transmission 10 is placed into the second gear position 2nd after the states shown in the views (d)-(f) of FIG. 4.

By the way, in the event of a failure or failures that occur in the springs 44 and/or the shift forks 60 of the switching mechanisms 34, for example, each of the switching mechanisms 34 is unlikely to be positioned in a desired position in the axial direction. Therefore, it is necessary to detect such a failure of the transmission 10 by which each switching mechanism 34 is unlikely to be positioned in a desired position in the axial direction. It might be possible to detect the failure in an arrangement in which a position sensor is provided for each of the first and second dog rings 40, 42. However, in such an arrangement, a large number of the position sensors would be required whereby the manufacturing cost would be increased.

In the present embodiment, the electronic control apparatus 100 includes a failure determining portion 122 configured to calculate an impulse L, based on the piston reaction force Fp generated during rotation of the shift barrel 64 and to determine whether the failure occurs or not, based on the calculated impulse L. Hereinafter, there will be described control functions of the failure determining portion 122. It is noted that the impulse L corresponds to "a reaction-force-related value" recited in the appended claims.

When determining that a shifting action of the transmission 10 has been initiated, the failure determining portion 122 calculates the impulse L during rotation of the shift barrel 64, more precisely, during a period of switching of one of the switching mechanisms 34a, 43b (which is to be switched from the connecting state to the disconnecting state during the shifting action of the transmission 10) from the connecting state to the disconnecting state. In other words, the failure determining portion 122 calculates the impulse L during a period in which the shift barrel 64 is rotated by a rotation angle θbrl corresponding to a movement of the shift fork 60 fitted in the switching mechanism 34 to the neutral-state establishing position PN from one of the first-gear, second-gear, third-gear and fourth-gear establishing positions P1-P4, which corresponds to a gear position established before the shifting action. Hereinafter, a shift-up action from the first gear position 1st to the second gear position 2nd will be described by way of example.

In the shift-up action from the first gear position 1st to the second gear position 2nd, the second switching mechanism 34b is switched to the disconnecting state, so that the second shift fork 60b fitted in the annular groove 58b of the second switching mechanism 34b is moved to the neutral-state establishing position PNb in process of the shift-up action. In process of movement of the second shift fork 60b to the neutral-state establishing position PNb, the first and second dog rings 40b, 42b are separated whereby the springs 44b of the second switching mechanism 34b are elastically deformed. Owing to the elastic deformation of the springs 44b, each spring 44b generates the elastic restoring force that acts as a reaction force against the shift barrel 64 through the second shift fork 60b, namely, acts in a direction that impedes the rotation of the shift barrel 64. This reaction force is transmitted, as a piston reaction force Fp, to each of the first and second pistons 76a, 76b through the pinion 72 and the rack 74, so as to act against each of the first and second pistons 76a, 76b. The piston pressure difference Ppd is increased in proportion to increase of the piston reaction force Fp. In the present embodiment, the piston reaction force Fp is calculated based on the piston pressure difference Ppd, and the impulse L as the reaction-force-related value related to the reaction force acting on the shift barrel 64 is calculated based on the piston reaction force Fp.

Figure 6:
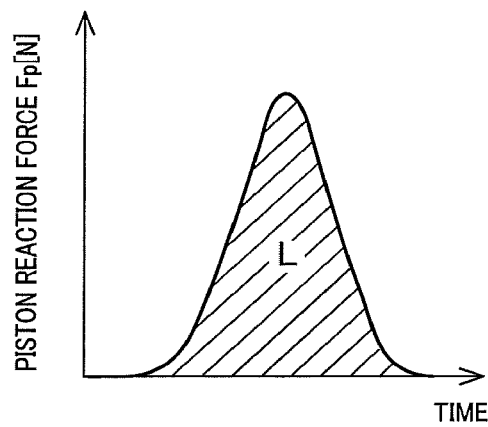
FIG. 6 is a view showing a relationship between a piston reaction force changed in process of a shifting action of the transmission and an elapsed time from initiation of the shifting action.

The failure determining portion 122 calculates the impulse L as the reaction-force-related value related to the reaction force acting on the shift barrel 64, based on the piston reaction force Fp that is calculated from the piston pressure difference Pdf, wherein the piston pressure difference Pdf is continuously detected during the shifting action of the transmission 10, more precisely, during a process of movement of the second shift fork 60b from the first-gear establishing position P1 to the neutral-state establishing position PNb, namely, during a period in which the shift barrel 64 is rotated by a rotation angle θbrl by which the second switching mechanism 34b is switched from the connecting state to the disconnecting state. The failure determining portion 122 calculates the impulse L in accordance with equation (1) given below. In the equation (1), "A" represents a pressure receiving area [mm$^2$] of each of the first and second pistons 76a, 76b, wherein the pressure receiving area A of the first piston 76a and the pressure receiving area A of the second piston 76b are equal to each other. FIG. 6 represents a relationship between the piston reaction force Fp and an elapsed time from initiation of the shifting action. The piston reaction force Fp corresponds to a product (Ppd A) of the piston pressure difference Ppd and the pressure receiving area A of the piston 76. An area of a hatched region surrounded by the piston reaction force Fp and a horizontal axis (axis representing the elapsed time) in FIG. 6 corresponds to the impulse L that is obtained by the equation (1) given below.

$$L=\int(Ppd*A)dt \qquad (1)$$

Further, the failure determining portion 122 determines whether the impulse L calculated during the rotation of the shift barrel 64 is within a predetermined normal range or not. The predetermined normal range is a range (Lmin-Lmax) which is obtained by experimentation or determined by an appropriate design theory and within which the impulse L is considered to vary even in normal case without the failure, by taking account of, for example, variation of each component, and is defined between a lower limit value Lmin and an upper limit value Lmax. When the impulse L calculated during the rotation of the shift barrel 64 is within the normal range (Lmin<L<Lmax), the failure determining portion 122 determines that the switching mechanisms 34 and a mechanism (driving apparatus 70) operating the switching mechanisms 34 normally work without failure. On the other hand, when the impulse L calculated during the rotation of the shift barrel 64 is outside the normal range (Lmin<L<Lmax), namely, when the impulse L is smaller than the lower limit value Lmin or larger than the upper limit value Lmax, the failure determining portion 122 determines that a failure occurs in the transmission 10 whereby each of the switching mechanisms 34 is unlikely to be positioned in a desired position in the axial direction.

When the impulse L is smaller than the lower limit value Lmin of the normal range, the failure determining portion 122 determines that breakage of the springs 44b of the second switching mechanism 34b, wear of the second shift groove 66b of the shift barrel 64, breakage or wear of the second shift fork 60b, or breakage or wear of the engaged pin 62b (which is provided in the second shift fork 60b and which is fitted in the second shift groove 66b) occurs.

Figure 7:
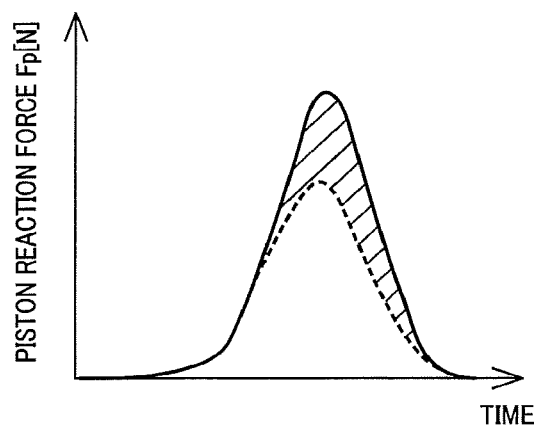
FIG. 7 is another view showing a relationship between the piston reaction force changed in process of a shifting action of the transmission and the elapsed time from initiation of the shifting action.

For example, if one of the plurality of springs 44b constituting the second switching mechanism 34b is broken, the elastic restoring force is not generated by the broken one of the springs 44b. Thus, the piston reaction force Fp is reduced and accordingly the impulse L is made smaller than the normal range. In FIG. 7 that shows a relationship between the piston reaction force Fp and the elapsed time, solid line represents the relationship between the piston reaction force Fp and the elapsed time in normal case while broken line represents the relationship between the piston reaction force Fp and the elapsed time in case of breakage of the springs 44b. As described above with reference to FIG. 6, since the area of a region surrounded by the piston reaction force Fp and the horizontal axis (axis representing the elapsed time) corresponds to the impulse L, the impulse L is made smaller in the case of breakage of the springs 44b than normal, by a value corresponding to an area of a hatched region in FIG. 7.

Figure 8:
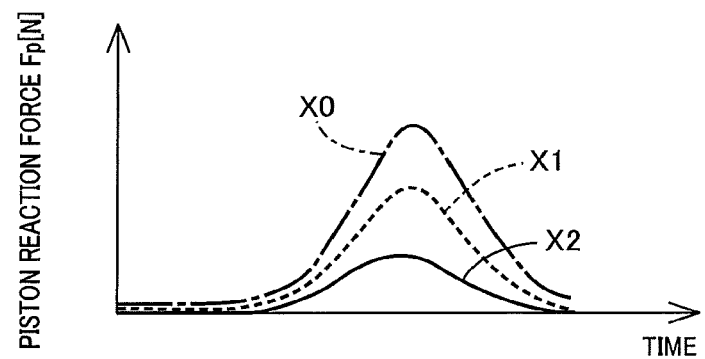
FIG. 8 is a view showing a relationship between the piston reaction force and the elapsed time in each of cases in which respective different numbers of springs were broken.

FIG. 8 shows a relationship between the piston reaction force Fp and the elapsed time in each of cases in which respective different numbers of springs 44b were broken. In FIG. 8, "X0" represents a relationship between the piston reaction force Fp and the elapsed time in period of switching of the second switching mechanism 34b to the disconnecting state in a case in which any of the springs 44b works normally without failure, "X1" represents a relationship between the piston reaction force Fp and the elapsed time in period of switching of the second switching mechanism 34b to the disconnecting state in a case in which one of the springs 44b was broken, and "X2" represents a relationship between the piston reaction force Fp and the elapsed time in period of switching of the second switching mechanism 34b to the disconnecting state in a case in which two of the springs 44b were broken.

As shown in FIG. 8, the elastic restoring force as a whole is reduced with increase of the number of broken ones of the springs 44b, so that the piston reaction force Fp in the switching process is reduced with increase of the number of the broken springs 44b. That is, the impulse L calculated in the period of switching of the second switching mechanism 34b to the disconnecting state is reduced with increase of the number of the broken springs 44b.

Figure 9:
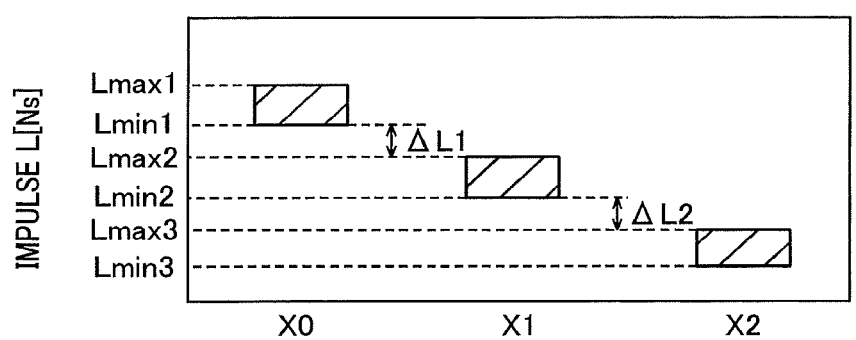
FIG. 9 is a view showing a possible range within which an impulse (as a reaction-force-related value) is likely to vary due to variation of each component, in each of cases in which respective different numbers of the springs were broken.

FIG. 9 shows a possible range within which the impulse L is likely to vary due to variation of each component, in each of cases in which respective different numbers of the springs 44b are broken. For example, in a case (X0) in which any one of the springs 44b is not broken, the possible range ranges from the lower limit value Lmin1 to the upper limit value Lmax1 by taking account of the variation of each component. In a case (X1) in which one of the springs 44b is broken, the possible range ranges from the lower limit value Lmin2 to the upper limit value Lmax2 by taking account of the variation of each component. In a case (X2) in which two of the springs 44b are broken, the possible range ranges from the lower limit value Lmin3 to the upper limit value Lmax3 by taking account of the variation of each component.

As shown in FIG. 9, the lower limit value Lmin1 of the possible range in the case (X0) in which any one of the springs 44b is not broken is larger than the upper limit value Lmax2 of the possible range in the case (X1) in which one of the springs 44b is broken, by a value ΔL1. Thus, a clear difference is seen between the case (X0) in which any one of the springs 44b is not broken and the case (X1) in which one of the springs 44b is broken. Further, the lower limit value Lmin2 of the possible range in the case (X1) in which one of the springs 44b is broken is larger than the upper limit value Lmax3 of the possible range in the case (X2) in which two of the springs 44b are broken, by a value ΔL2. Thus, a clear difference is seen between the case (X1) in which one of the springs 44b is broken and the case (X2) in which two of the springs 44b are broken. Therefore, the breakage of the springs 44b and also the number of broken springs 44b can be determined based on a value of the impulse L.

Further, also in a case in which the second shift groove 66b of the shift barrel 64 is worn, the impulse L is made lower than the lower limit value Lmin of the normal range. In the case in which the second shift groove 66b is worn, there is a case in which the second shift fork 60b does not reach the neutral-state establishing position PNb even when the rotation angle θbrl of the shift barrel 64 reaches an angle value which corresponds to the neutral-state establishing position PNb, namely, an angle value by which the second shift fork 60b is to be positioned in the neutral-state establishing position PNb. In such a case, the elastic restoring force generated by the springs 44b is reduced and accordingly the piston reaction force Fp is also reduced whereby the impulse L is reduced. Therefore, when the impulse L is made smaller than the lower limit value Lmin of the normal range, it is also considered that the second shift groove 66b is worn.

Further, also in a case in which the second shift fork 60b is broken or worn and/or the engaged pin 62b provided in the second shift fork 60b is broken or worn, each of the springs 44b is not elastically deformed or an amount of deformation of each spring 44b is made smaller than normal, so that the impulse L is made smaller than the lower limit value Lmin of the normal range.

Therefore, when the impulse L, which is calculated in process of the switching process of the second switching mechanism 34b (during rotation of the shift barrel 64), is smaller than the lower limit value Lmin of the normal range, the failure determining portion 122 determines that a breakage of the springs 44b of the second switching mechanism 34b, a wear of the second shift groove 66b of the shift barrel 64, a breakage or wear of the second shift fork 60b, or a breakage or wear of the engaged pin 62b (which is provided in the second shift fork 60b) occurs.

On the other hand, when the calculated impulse L is larger than the upper limit value Lmax of the normal range, the failure determining portion 122 determines that an increase of resistance against sliding movement of each of the first and second dog rings 40b, 42b relative to the hub sleeve 38 occurs, or a drawback that the springs 44b are not restored from the elastic deformations occurs.

There is a case in which axes of the respective first and second dog rings 40b, 42b are inclined with respect to an axis of the hub sleeve 38, for example, due to wear of the hub sleeve 38. In this case, the resistance against the sliding movement of each of the first and second dog rings 40b, 42b relative to the hub sleeve 38 is increased, and accordingly an increased force is required to move the second shift fork 60b, so that the piston reaction force Fp during the movement of the second switching mechanism 34b is made larger than normal. Therefore, the impulse L calculated in the period of switching of the second switching mechanism 34b to the disconnecting state is made larger than the upper limit value Lmax.

When the drawback that the springs 44b are not restored from the elastic deformations, the elastic restoring force of the springs 44b is made larger than normal and the piston reaction force Fp is likely to be made larger than normal. In this case, the impulse L calculated in the period of switching of the second switching mechanism 34b to the disconnecting state is made larger than the upper limit value Lmax.

Figure 10:
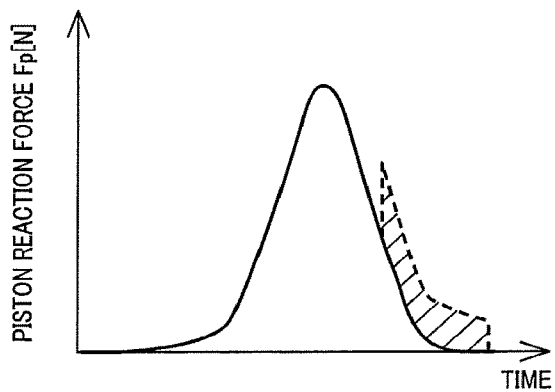
FIG. 10 is a view showing a relationship between the piston reaction force and the elapsed time in a period of switching of the second switching mechanism in a case in which resistance against sliding movements of first and second dog rings relative to a hub sleeve is increased.

FIG. 10 shows a relationship between the piston reaction force Fp and the time in the period of switching of the second switching mechanism 34b in a case in which the resistance against sliding movements of the first and second dog rings 40b, 42b relative to the hub sleeve 38 is increased. In FIG. 10, solid line represents the relationship between the piston reaction force Fp and the time in normal case, and broken line represents the relationship between the piston reaction force Fp and the time in the event of the failure. As indicated by broken line in FIG. 10, the piston reaction force Fp is made larger than normal, by the increase of the resistance against the sliding movements. Therefore, the increase of the resistance against the sliding movements makes the impulse L larger than normal by a value corresponding to an area of a hatched region in FIG. 10.

Thus, when the impulse L calculated in the period of switching of the second switching mechanism 34b (during rotation of the shift barrel 64) is larger than the upper limit value Lmax of the normal range, the failure determining portion 122 determines occurrence of an increase of resistance against sliding movement of each of the first and second dog rings 40b, 42b relative to the hub sleeve 38 due to wear of the hub sleeve 38 or occurrence of a drawback that the springs 44b are not restored from the elastic deformations.

As described above, when the impulse L calculated in the period of switching of the second switching mechanism 34b to the disconnecting state is deviated from the normal range (Lmin-Lmax), the failure determining portion 122 specifies or determines at least one factor of the failure, depending on whether the impulse L is larger than the upper limit value Lmax of the normal range (L>Lmax) or is smaller than the lower limit value Lmin of the normal range (L<Lmin).

Further, the failure determining portion 122 is capable of further specifying a factor of the failure, in view of the impulse L calculated in the period of switching of the second switching mechanism 34b. For example, it is possible to determine a possible range within which the impulse L is likely to lie in the period of switching of the second switching mechanism 34b to the disconnecting state, for example, by experimentation or determined by an appropriate design theory, for each of various factors of the failure. The possible range determined for each of the various factors of the failure can be stored in the failure determining portion 122. The various factors of the failure are, for example, (i) breakage of one of the springs 44b, (ii) breakages of two of the springs 44b, (iii) wear of the second shift groove 66b of the shift barrel 64, (iv) breakage or wear of the second shift fork 60b, (v) breakage or wear of the engaged pin 62b, (vi) increase of resistance against sliding movements of the first and second dog rings 40b, 42b relative to the hub sleeve, and (vii) drawback that the springs 44b are not restored from the elastic deformations. The failure determining portion 122 compares the impulse L calculated in the period of switching of the second switching mechanism 34b to the disconnecting state, with the possible range determined for each of the above-described various factors of the failure, and abstracts at least one of the various factors each having the possible range within which the calculated impulse L lies. The thus abstracted factor or factors are determined as the factor or factors of the failure. There would be a case in which two or more of the above-described factors are abstracted depending on a value of the calculated impulse L. In such a case, one of the abstracted factors may be determined as the factor of the failure.

Further, while there has been described, by way of example, the case in which the shift-up action from the first gear position 1st to the second gear position 2nd is executed, the failure determining portion 122 is configured to make the failure determination also in any of other shifting action that is other than the shift-up action from the first gear position 1st to the second gear position 2nd. For example, in a case of execution of a shift-up action from the second gear position 2nd to the third gear position 3rd, the first switching mechanism 34a is switched to the disconnecting state. In this case, the springs 44a of the first switching mechanism 34 are elastically deformed by movement of the first shift fork 60a. Therefore, in the execution of the shift-up action from the second gear position 2nd to the third gear position 3rd, it is possible to make a determination about a failure of the transmission 10 that disables the first switching mechanism 34a to be positioned in a desired position, by executing the failure determination by the failure determining portion 122. Further, it is possible to determine at least one failure factors such as a breakage of the springs 44a of the first switching mechanism 34a, a breakage or wear of the first shift fork 60a and a breakage or wear of the engaged pin 62a provided in the first shift fork 60a, based on the impulse L. Further, in execution of a shift-up or shift-down action to any other gear position, it is possible to make a determination about a failure of the transmission 10 that disables the switching mechanism 34 to be positioned in a desired position, and also to determine at least one failure factors as needed, by executing the failure determination by the failure determining portion 122.

Figure 11:
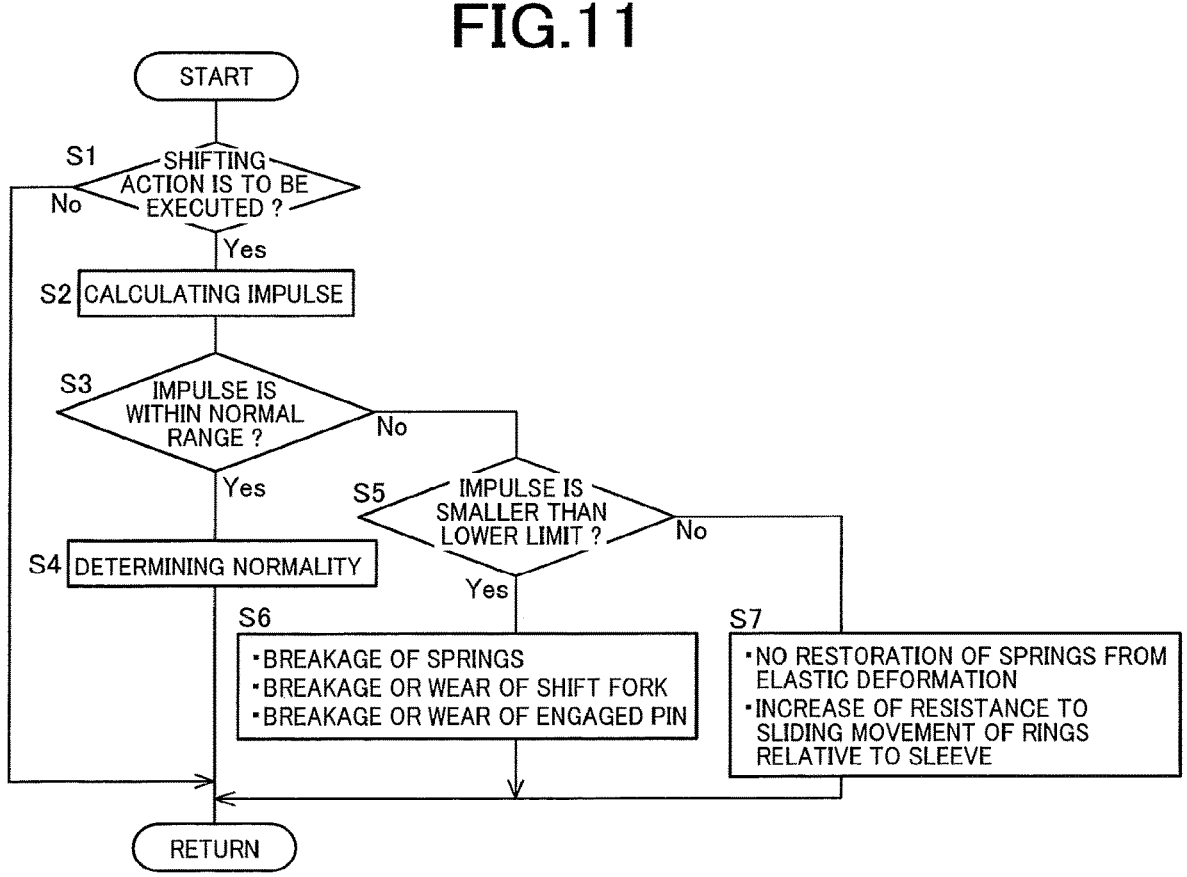
FIG. 11 is a flow chart showing a main part of a control routine executed by an electronic control apparatus shown in FIG. 5, namely, a control routine that is executed for detecting or determining a failure of the transmission during a shifting action of the transmission.
Figure 12:
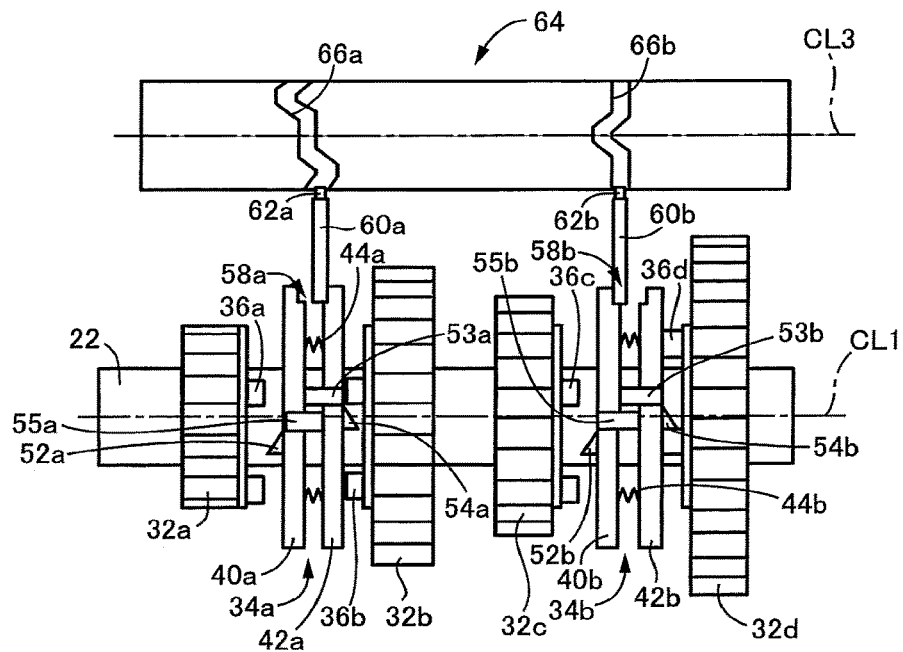
FIG. 12 is a view showing an operation state of each of first and second switching mechanisms during a shifting action of the transmission, in another embodiment of the present invention.

FIG. 11 is a flow chart showing a main part of a control routine executed by the electronic control apparatus 100, namely, a control routine that is executed for detecting or determining occurrence of a failure of the transmission 10 during a shifting action of the transmission 10. This control routine is executed in a repeated manner during running of the vehicle.

The control routine is initiated with step S1 corresponding to control function of the switching control portion 120, which is implemented to determine whether a shifting action is to be executed in the transmission 10. When a negative determination is made at step S1, one cycle of execution of the control routine is terminated. When an affirmative determination is made at step S1, step S2 corresponding to control function of the failure determining portion 122 is implemented to calculate the impulse L in a range of the rotation angle θbrl of the shift barrel 64 which corresponds to a period from a point of time at which the shifting action is initiated, to a point of time at which the shift fork 60 fitted in the switching mechanism 34 (that is to be switched to the disconnecting state by the execution of the shifting action) is moved to the neutral-state establishing position PN. Step S2 is followed by step S3 corresponding to control function of the failure determining portion 122, which is implemented to determine whether the impulse L calculated at step S2 is within the normal range (Lmin-Lmax). When an affirmative determination is made at step S3, step S4 corresponding to control function of the failure determining portion 122 is implemented to determine that the transmission 10 is in its normal state, namely, determine that the second switching mechanism 34b and the mechanism operating the second switching mechanism 34b work normally.

When a negative determination is made at step S3, it is determined that a failure, which disables the switching mechanism 34 to be positioned in a desired position, occurs in the transmission 10, and the control flow goes to step S5 corresponding to control function of the failure determining portion 122, which is implemented to determine whether the impulse L is smaller than the lower limit value Lmin. When an affirmative determination is made at step S5, step S6 corresponding to control function of the failure determining portion 122 is implemented to determine that the breakage of the springs 44, the breakage or wear of the shift fork 60, or the breakage or wear of the engaged pin 62 occurs as the factor of the failure of the switching mechanism 34. When a negative determination is made at step S5, the control flow goes to step S7 corresponding to control function of the failure determining portion 122, which is implemented to determine that the drawback that the springs 44 are not restored from the elastic deformations or the increase of resistance against the sliding movements of the first and second dog rings 40, 42 relative to the hub sleeve 38 occurs as the factor of the failure of the switching mechanism 34.

As described above, in the present embodiment, when the impulse L calculated during the rotation of the shift barrel 64 is deviated from the predetermined normal range, it is determined that a failure occurs in the transmission 10. It is therefore possible to detect or determine occurrence of the failure of the transmission 10, even without provision of sensors or other devices for detecting the failure.

In the present embodiment, it is possible to specify or determine at least one factor of the failure, by determining whether the impulse L calculated during the rotation of the shift barrel 64 is larger than the predetermined normal range or is smaller than the predetermined normal range. For example, when the impulse L is smaller than the lower limit value Lmin of the normal range, it is determined that the breakage of the springs 44, the breakage or wear of the shift forks 60 and/or the breakage or wear of the shift barrel 64 occur in the transmission 10. On the other hand, when the impulse L is larger than the lower limit value Lmin of the normal range, it is determined that the drawback that the springs 44 are not restored from the elastic deformations and/or the increase of resistance against the sliding movement of the switching mechanisms 34 relative to the hub sleeve 38 occur in the transmission 10.

In the present embodiment, since the resistance force is generated owing to the elastic restoring force generated by the springs 44 that are elastically deformed in the period of switching of the switching mechanism 34 from the connecting state to the disconnecting state in execution of a shifting action of the transmission 10, it is possible to determine the occurrence of the failure, by calculating the impulse L in the period of the switching of the switching mechanism 34.

There will be described another embodiment of this invention. The same reference signs as used in the above-described first embodiment will be used in the following embodiment, to identify the functionally corresponding elements, and descriptions thereof are not provided.

Second Embodiment

In the above-described first embodiment, the failure determination is made based on the impulse L calculated in the period of switching of the switching mechanism 34 that is switched from the connecting state to the disconnecting state in the execution of a shifting action of the transmission 10. In this second embodiment, the failure determination is made based on the impulse L calculated during rotation of the shift barrel 64, specifically, in a period of switching of the switching mechanism 34 that is switched from the disconnecting state to the connecting state in the execution of a shifting action of the transmission 10. There will be described, by way of example, a case in which a shift-up action from the first gear position 1st to the second gear position 2nd is executed.

In the execution of the shift-up action from the first gear position 1st to the second gear position 2nd, the second switching mechanism 34b is placed in a state as shown in the view (b) of FIG. 4, and then the first switching mechanism 34a is moved to a position as shown in the view (c) of FIG. 4. In an usual shifting action, in a period of movement of the first switching mechanism 34a in the axial direction, a position and a movement speed of the first switching mechanism 34a are controlled such that the second and third meshing teeth 53a, 54a of the first switching mechanism 34a do not collide with the second-gear dog teeth 36b of the second transmission gear 32b. Specifically, in the period of movement of the first switching mechanism 34a, a rotation angle and a rotational speed of each of the second and third meshing teeth 53a, 54a are calculated based on the rotation angle θout and the rotational speed Nout of the output shaft 22, and a rotational angle and a rotational speed of the second-gear dog teeth 36b are calculated based on the rotation angle θcon and the rotational speed Ncon of the counter shaft 20. Then, from the calculated rotation angles and rotational speeds, a relative rotation angle of each of the second and third meshing teeth 53a, 54a relative to a corresponding one of the second-gear dog teeth 36b and also a relative rotational speed of each of the second and third meshing teeth 53a, 54a relative to a corresponding one of the second-gear dog teeth 36b are calculated. The position and the movement speed of the first switching mechanism 34a are adjusted based on the calculated relative rotation angles and relative rotational speeds, such that the switching mechanism 34a is moved to be positioned in the position as shown in the view (c) of FIG. 4 without any of the above-described teeth colliding with each other during the movement of the first switching mechanism 34a.

On the other hand, a switching control portion 150, which is shown in FIG. 5 by reference sign with parenthesis, according to this second embodiment is configured, in a period in which the first switching mechanism 34a is switched from disconnecting state to the connecting state with the movement of the first switching mechanism 34a toward the second transmission gear 32b, to cause the second meshing teeth 53a of the first switching mechanism 34a to collide with the second-gear dog teeth 36b so as to cause the springs 44 to be elastically deformed during the movement of the first switching mechanism 34a. In this case, the position and the movement speed of the first switching mechanism 34a are adjusted based on the relative rotation angle and the relative rotational speed of the second meshing teeth 53a of the first switching mechanism 34a relative to the second-gear dog teeth 36b, such that the second meshing teeth 53a collide with the second-gear dog teeth 36b during the movement of the first switching mechanism 34a.

A failure determining portion 152, which is shown in FIG. 5 by reference sign with parenthesis, according to this second embodiment is configured to calculate the impulse L during a period of switching of the switching mechanism 34a from the disconnecting state to the connecting state, more precisely, in a period in which the springs 44 of the first switching Mechanism 34a are elastically deformed by collisions of the second meshing teeth 53a with the second-gear dog teeth 36b, and then to determine whether the calculated impulse L is within the predetermined normal range.

When the impulse L is inside the normal range (Lmin-Lmax), the failure determining portion 152 determines that the first switching mechanism 34a and the mechanism operating the first switching mechanism 34a work normally.

On the hand, when the impulse L is smaller than the lower limit value Lmin of the normal range, the failure determining portion 152 determines that a breakage of the springs 44a of the first switching mechanism 34a, a wear of the first shift groove 66a of the shift barrel 64, a breakage or wear of the first shift fork 60a, or a breakage or wear of the engaged pin 62a (which is provided in the first shift fork 60a) occurs.

Further, when the impulse L is larger than the upper limit value Lmax of the normal range, the failure determining portion 152 determines that an increase of resistance against sliding movement of each of the first and second dog rings 40a, 42a relative to the hub sleeve 38 occurs, or a drawback that the springs 44a of the first switching mechanism 34a are not restored from the elastic deformations occurs.

While there has been described, by way of example, the case in which the shift-up action from the first gear position 1st to the second gear position 2nd is executed, the failure determining portion 152 is configured to make the failure determination also in any of other shifting action. For example, in a case of execution of a shift-up action from the second gear position 2nd to the third gear position 3rd, the second switching mechanism 34b is switched to the connecting state. In this case, during the movement of the second switching mechanism 34b, the fourth meshing teeth 55b of the second switching mechanism 34b are caused to collide with the third-gear dog teeth 36c of the third transmission gear 32c whereby the springs 44b are elastically deformed. Therefore, in the execution of the shift-up action from the second gear position 2nd to the third gear position 3rd, it is possible to make a determination about a failure of the transmission 10 that disables the second switching mechanism 34b to be positioned in a desired position, by executing the failure determination by the failure determining portion 152.

Figure 13:
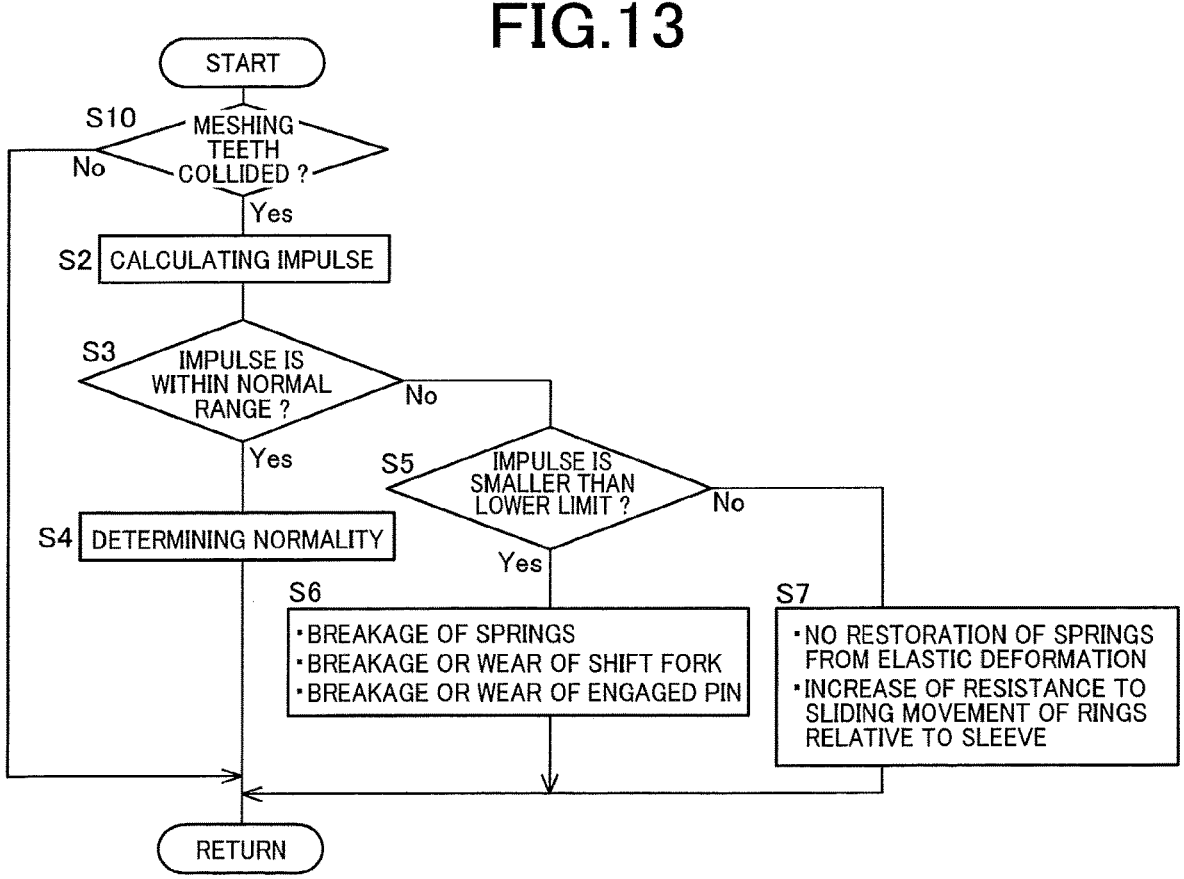
FIG. 13 is a flow chart showing a main part of a control routine executed by an electronic control apparatus according to the other embodiment, namely, a control routine that is executed for detecting or determining a failure of the transmission during a shifting action of the transmission.

FIG. 13 is a flow chart showing a main part of a control routine executed by an electronic control apparatus 140 (shown in FIG. 5 by reference sign with parenthesis) according to this second embodiment, namely, a control routine that is executed for detecting or determining a failure of the transmission 10 during a shifting action of the transmission 10.

The control routine is initiated with step S10 corresponding to control function of the switching control portion 150, which is implemented to determine whether the second meshing teeth 53 or fourth meshing teeth 55 of the switching mechanism 34 (that is to be switched to the connecting state in the execution of the shifting action) have collided with the gear dog teeth 36 of the transmission gears 32. When a negative determination is made at step S10, one cycle of execution of the control routine is terminated. When an affirmative determination is made at step S10, step S2 corresponding to control function of the failure determining portion 152 is implemented to calculate the impulse L from a point of time at which the springs 44 start to be elastically deformed by the collisions of the second meshing teeth 53 or fourth meshing teeth 55 of the switching mechanism 34 with the gear dog teeth 36 of the transmission gears 32. Step S2 is followed by step S3 corresponding to control function of the failure determining portion 152, which is implemented to determine whether the impulse L calculated at step S2 is within the normal range (Lmin-Lmax). When an affirmative determination is made at step S3, step S4 corresponding to control function of the failure determining portion 152 is implemented to determine that the switching mechanism 34 and the mechanism operating the switching mechanism 34 work normally.

When a negative determination is made at step S3, it is determined that a failure, which disables the switching mechanism 34 to be positioned in a desired position, occurs in the transmission 10, and the control flow goes to step S5 corresponding to control function of the failure determining portion 152, which is implemented to determine whether the impulse L is smaller than the lower limit value Lmin. When an affirmative determination is made at step S5, step S6 corresponding to control function of the failure determining portion 152 is implemented to determine that the breakage of the springs 44, the breakage or wear of the shift fork 60, or the breakage or wear of the engaged pin 62 occurs as the factor of the failure of the switching mechanism 34. When a negative determination is made at step S5, the control flow goes to step S7 corresponding to control function of the failure determining portion 152, which is implemented to determine that the drawback that the springs 44 are not restored from the elastic deformations or the increase of resistance against the sliding movements of the first and second dog rings 40, 42 relative to the hub sleeve 38 occurs as the factor of the failure of the switching mechanism 34.

As described above, in this second embodiment, too, it is possible to obtain substantially the same technical advantages as in the above-described first embodiment. Further, in this second embodiment, since the resistance force is generated owing to the elastic restoring force generated by the springs 44 that are elastically deformed by collisions of the second meshing teeth 53 or fourth meshing teeth 55 with the gear dog teeth 36 in the period of switching of the switching mechanism 34 from the disconnecting state to the connecting state in execution of a shifting action of the transmission 10, it is possible to determine occurrence of the failure, by detecting the impulse L in the period of the switching of the switching mechanism 34.

While the preferred embodiments of this invention have been described in detail by reference to the drawings, it is to be understood that the invention may be otherwise embodied.

For example, either of the above-described first and second embodiments does not necessarily have to be carried out without the other being carried out, but may be carried out together with the other. For example, it is possible to combine the functions of the failure determining portion 122 and the failure determining portion 152, such that, for example, in the execution of the shift-up action from the first gear position 1st to the second gear position 2nd, the function of the failure determining portion 122 is carried out in the period of switching of the second switching mechanism 34b to the disconnecting state, and the function of the failure determining portion 152 is carried out in the period of switching of the first switching mechanism 34a to the connecting state.

In the above-described second embodiment, for example, in the execution of the shift-up action from the first gear position 1st to the second gear position 2nd, the second meshing teeth 53a of the first switching mechanism 34a are caused to collide with the second-gear dog teeth 36b of the second transmission gear 32b. However, it is possible to modify this arrangement such that the third meshing teeth 54a of the first switching mechanism 34a are caused to collide with the second-gear dog teeth 36b. In this modified arrangement, when the inclined surface 68 of the third meshing teeth 54a is deformed or worn, the impulse L is made smaller than normal. Thus, when the impulse L is smaller than the lower limit value Lmin of the normal range, it is determined that the deformation or wear of the inclined surface 68 of the third meshing teeth 54b is a factor of the failure.

In the above-described embodiments, the shift barrel 64 is rotated by the hydraulically-operated first and second pistons 76a, 76b. However, the shift barrel 64 may be rotated by, for example, an electric motor. In this modification, the reaction-force-related value related to the reaction force acting on the shift barrel 64 is calculated based on an electric current supplied to the electric motor. Further, in the above-described embodiments, a linear motion of each of the first and second pistons 76a, 76b is converted into a rotary motion through the pinion 72 and the rack 64. However, the linear motion may be converted into the rotary motion through any mechanism such as a worm gear as long as the mechanism is capable of converting a linear motion into a rotary motion.

In the above-described embodiments, the failure determination is made based on the impulse L calculated during rotation of the shift barrel 64. However, the failure determination may be made, for example, based on a work done that is calculated by taking account of a stroke amount of each of the pistons 76a, 76b in addition to the piston reaction force Fp. That is, it is possible to use any reaction-force-related value related to the reaction force acting on the shift barrel 64 during rotation of the shift barrel 64.

In the above-described embodiments, the failure determination is made during execution of a shifting action of the transmission 10. However, the failure determination may be made, for example, by temporarily moving the second switching mechanism 34b, which is placed in the connected state, to a state shown in the view (b) of FIG. 4, and then calculating the impulse L at that time during running of the vehicle with the transmission 10 being placed in the first gear position 1st. Thus, the failure determination does not have to be made necessarily during execution of a shifting action of the transmission 10, but may be made as needed as long as the vehicle running is not affected.

In the above-described embodiments, the transmission 10 is provided with the four pairs of gears 28a-28d and is capable of establishing four forward gear positions. However, the present invention is applicable also to a transmission provided with six pairs of gears and three switching mechanisms 34 and capable of establishing six forward gear positions, for example. That is, the present invention is applicable to any transmission which is provided with a plurality of pairs of gears and a switching mechanism or mechanisms and which is capable of establishing a plurality of gear positions.

It is to be understood that the embodiments described above are given for illustrative purpose only, and that the present invention may be embodied with various modifications and improvements which may occur to those skilled in the art.

NOMENCLATURE OF ELEMENTS

10: vehicle transmission
22: output shaft (shaft)
32a-32d: transmission gears
34a,34b: first and second switching mechanisms
36a-36d: first through fourth-gear dog teeth (gear-side meshing teeth)
40a, 40b: first dog ring (first ring, second ring)
42a, 42b: second dog ring (first ring, second ring)
44a, 44b: spring (elastic member)
52a, 52b: first meshing teeth (first meshing teeth)
53a, 53b: second meshing teeth (second meshing teeth)
54a, 54b: third meshing teeth (first meshing teeth)
55a, 55b: fourth meshing teeth (second meshing teeth)
60a, 60b: first and second shift forks
64: shift barrel
100, 140: electronic control apparatus (control apparatus)
122, 152: failure determining portion

What is claimed is:

1. A control apparatus for a vehicle transmission that includes (i) a shaft, (ii) a plurality of transmission gears which are disposed on the shaft, (iii) a switching mechanism which is disposed to be adjacent to one of the transmission gears in an axial direction of the shaft and which is to be switched between a connecting state in which the one of the transmission gears is rotatable integrally with the shaft and a disconnecting state in which the one of the transmission gears is rotatable relative to the shaft, (iv) a shift fork which is configured to move the switching mechanism in the axial direction and (v) a shift barrel that is to be rotated to position the shift fork in a position that is dependent on a rotation angle of the shift barrel, in the axial direction,
wherein the switching mechanism includes (iii-1) first and second rings which are disposed on the shaft so as to be arranged in the axial direction and which are unrotatable relative to the shaft and movable relative to the shaft in the axial direction and (iii-2) an elastic member which is disposed between the first and second rings in the axial direction and connects the first and second rings, and
wherein said control apparatus comprises a failure determining portion configured to determine that a failure occurs in the vehicle transmission, when a reaction-force-related value related to a reaction force that acts on the shift barrel during rotation of the shift barrel is deviated from a predetermined range.

2. The control apparatus according to claim 1, wherein said failure determining portion is configured, when determining that the failure occurs in the vehicle transmission, to determine at least one factor of the failure, depending on whether the reaction-force-related value is larger than an upper limit value of the predetermined range or is smaller than a lower limit value of the predetermined range.

3. The control apparatus according to claim 2, wherein said failure determining portion is configured to determine that a breakage of the elastic member, a breakage or wear of the shift fork and/or a breakage or wear of the shift barrel occur in the vehicle transmission, when the reaction-force-related value is smaller than the lower limit value of the predetermined range.

4. The control apparatus according to claim 2, wherein said failure determining portion is configured to determine that a drawback that the elastic member is not restored from an elastic deformation thereof and/or an increase of resistance against sliding movement of the switching mechanism relative to the shaft occur in the vehicle transmission, when the reaction-force-related value is larger than the upper limit value of the predetermined range.

5. The control apparatus according to claim 1, wherein said failure determining portion is configured to detect the reaction-force-related value during a period of switching of the switching mechanism from the connecting state to the disconnecting state in execution of a shifting action of the transmission in which the switching mechanism is switched from the connecting state to the disconnecting state.

6. The control apparatus according to claim 1, wherein said failure determining portion is configured to detect the reaction-force-related value during a period of switching of the switching mechanism from the disconnecting state to the connecting state in execution of a shifting action of the transmission in which the switching mechanism is switched from the disconnecting state to the connecting state.

7. The control apparatus according to claim 1, wherein said failure determining portion is configured to calculate an impulse as the reaction-force-related value, and is configured, when the calculated impulse is deviated from the predetermined range, to determine that the failure occurs in the vehicle transmission.

8. The control apparatus according to claim 1,
wherein the first ring is disposed in a position adjacent to the one of the transmission gears in the axial direction of the shaft,
wherein the second ring is disposed on one of opposite sides of the first ring, which is remote from the one of the transmission gears, in the axial direction,
wherein the first ring is provided with first meshing teeth which protrude toward the one of the transmission gears,
wherein the second ring is provided with second meshing teeth which pass through the first ring and which protrude toward the one of the transmission gears, such that the first meshing teeth and the second meshing teeth are arranged in a circumferential direction of the shaft, and
wherein the one of the transmission gears is provided with gear-side meshing teeth that are to be brought into meshing engagements with the first and second meshing teeth of the first and second rings.

9. The control apparatus according to claim 1,
wherein the switching mechanism is to be switched between the connecting state and the disconnecting state, by being moved in the axial direction by the shift fork, and
wherein said control apparatus further comprises a switching control portion configured, when determining that a shifting action is to be executed in the vehicle transmission, to switch the switching mechanism from one of the connecting state and the disconnecting state to the other of the connecting state and the disconnecting state, by rotating the shift barrel in a direction that causes the switching mechanism to be moved by the shift fork in a direction that causes the switching mechanism to be switched from the one of the connecting state and the disconnecting state to the other of the connecting state and the disconnecting state.

10. The control apparatus according to claim 9,
wherein the vehicle transmission further includes a shift barrel actuator configured to rotate the shift barrel, and
wherein said switching control portion is configured, when the shift barrel is rotated, to control the shift barrel actuator based on a deviation of a detected value of the rotation angle of the shift barrel from a target value of the rotation angle, such that the deviation is reduced.

* * * * *